(12) United States Patent
Vincent et al.

(10) Patent No.: US 6,731,532 B2
(45) Date of Patent: May 4, 2004

(54) FIELD ADDRESSABLE REWRITABLE MEDIA

(75) Inventors: Kent D. Vincent, Cupertino, CA (US); Xiao-An Zhang, Sunnyvale, CA (US); R. Stanley Williams, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/264,812

(22) Filed: Oct. 3, 2002

(65) Prior Publication Data

US 2003/0058713 A1 Mar. 27, 2003

Related U.S. Application Data

(62) Division of application No. 09/919,394, filed on Jul. 31, 2001, now Pat. No. 6,556,470.

(51) Int. Cl.[7] ............................................. G11C 13/00
(52) U.S. Cl. ........................................ 365/151; 365/153
(58) Field of Search .................................. 365/151, 153, 365/164

(56) References Cited

U.S. PATENT DOCUMENTS

| 4,775,820 A | * | 10/1988 | Eguchi et al. ............... 313/504 |
| 6,031,756 A | * | 2/2000 | Gimzewski et al. ......... 365/151 |
| 2003/0081469 A1 | * | 5/2003 | Vincent et al. .............. 365/200 |

* cited by examiner

*Primary Examiner*—Thong Q. Le

(57) ABSTRACT

An electrochromic molecular colorant and a plurality of uses as an erasably writeable medium. Multitudinous types of substrates, such as paper, are adaptable for receiving a coating of the colorant. Electrical fringe field or through fields are used to transform targeted pixel molecules between a first, high color state and transparent state, providing information content having resolution and viewability at least equal to hard copy document print. The scope of the invention includes both the liquid coating and the combination of coating on substrate.

39 Claims, 4 Drawing Sheets

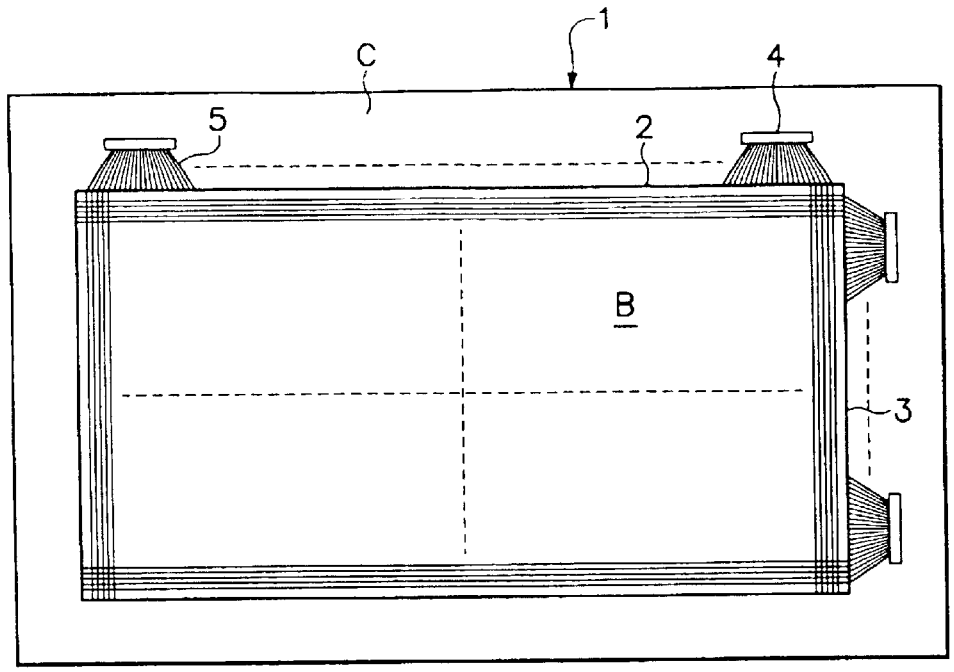
FIG.1AA
(PRIOR ART)
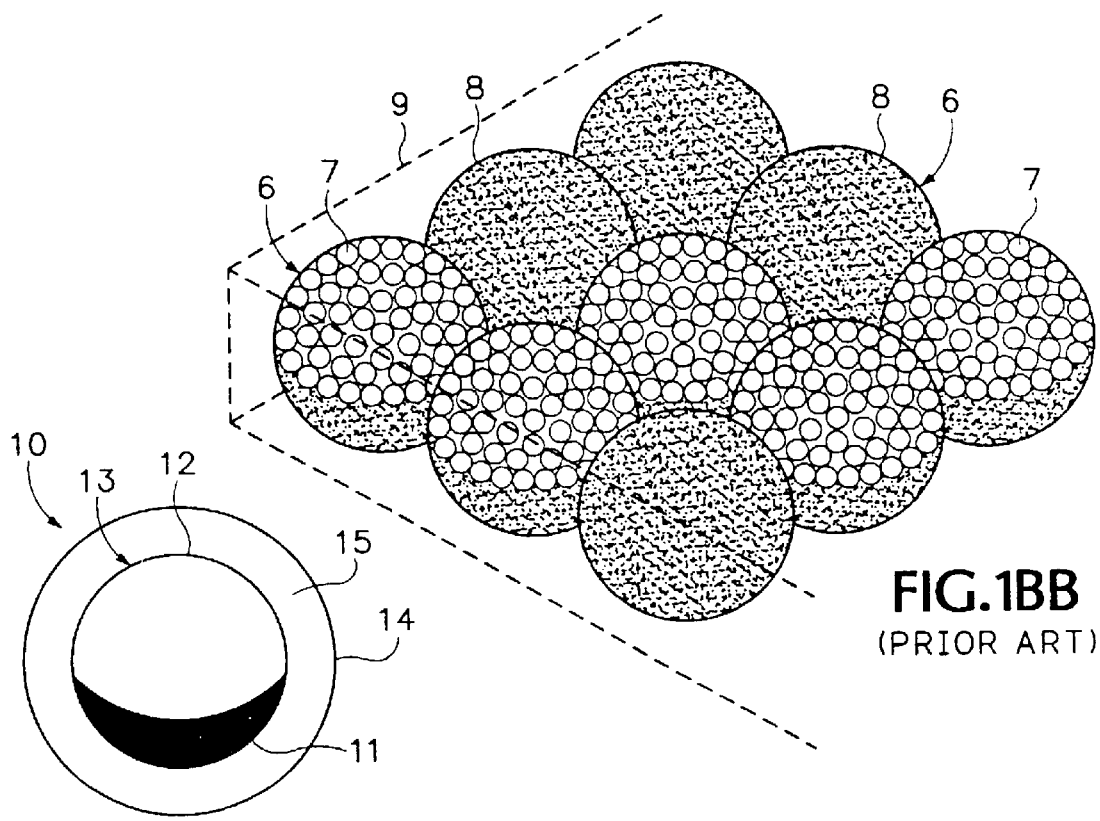
FIG.1BB
(PRIOR ART)
FIG.1CC
(PRIOR ART)

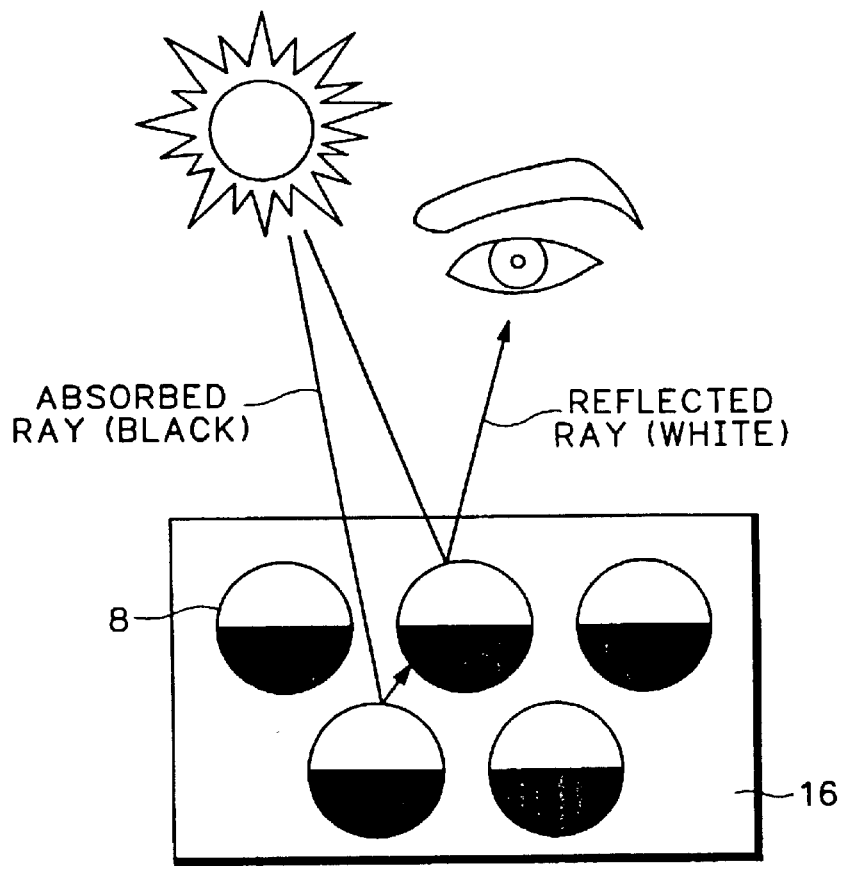
FIG.1DD
(PRIOR ART)
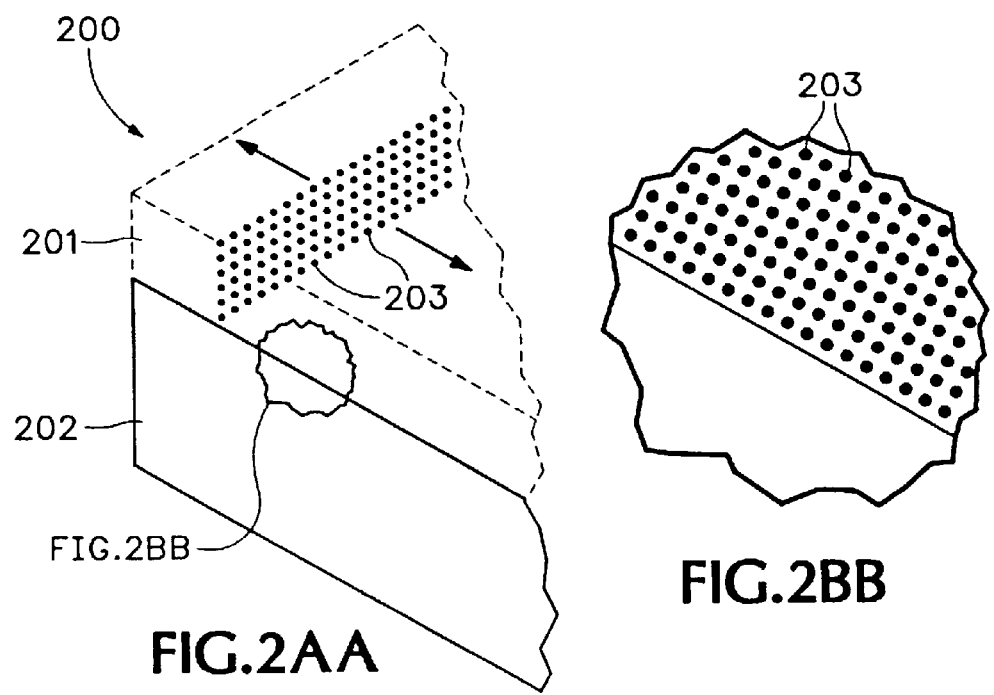
FIG.2AA
FIG.2BB

FIELD ADDRESSABLE REWRITABLE MEDIA

CROSS-REFERENCE TO RELATED APPLICATIONS

This is a divisional of appln. Ser. No. 09/919,394 filed Jul. 31, 2001 now U.S. Pat. No. 6,556,470.

STATEMENT REGARDING FEDERALLY SPONSORED RESEARCH OR DEVELOPMENT

Not Applicable.

REFERENCE TO AN APPENDIX

The present application includes a hard copy appendix comprising pertinent specification pages and drawings of co-inventors' U.S. patent application Ser. No. 09/844,862, filed Apr. 27, 2001, by ZHANG et al. for MOLECULAR MECHANICAL DEVICES WITH A BAND GAP CHANGE ACTIVATED BY AN ELECTRIC FIELD FOR OPTICAL SWITCHING APPLICATIONS (Hewlett-Packard Company docket no. 10013977) as relates to subject matter claimed in accordance with the present invention.

BACKGROUND OF THE INVENTION

1. Field of the Invention

The present invention relates generally to methods and apparatus for distribution of information, more specifically to electronically displaying informational content and, more particularly to a reusable, high contrast, very high resolution, rewritable print medium and methods for fabrication thereof.

2. Description of Related Art

Hard copy and, more recently, electronic display information is communicated in many forms and by many means. Erasable-rewritable print media communication tools range from simple pencil-on-paper to chalk-on-blackboard to dry marker pen-on-whiteboard. More sophisticated hard copy processes allow mechanized business and commercial printing processes—including laser and ink-jet printers, offset lithography, silkscreen, and the like, for printing—but those processes are usually restricted to the permanent print category (versus "erasable print" or "erasably writable" formats and methods). The bulk of print is commercially produced and made available through books, magazines, newspapers, and various other forms of permanent ink ("toner" or, more generically "colorant") on cellulose fiber media (commonly known as "paper"). The information content—generally alphanumeric text and graphical images—contained in this form is of a sufficiently high resolution and contrast to be easily read over prolonged periods of time without eye discomfort. Compared to electronic devices, hard copy media has the advantages of having zero power consumption while remaining highly portable, allowing comfortable reading in locations of choice and body positions that may be periodically varied to change reading distance and posture to maintain comfort. Such print media, however, requires a relatively high cost in printing, binding, warehousing, and distribution. The hard copy cost, independent of printing means, is normally amortized through a single reading, after which the book or other document is physically stored or discarded. Since these latter cost factors also require a definable time expenditure between content generation and availability to the reader, the content of the media is not contemporaneous; e.g., today's newspaper actually is filled with "what happened yesterday."

Much print is created by hand, e.g., using pen or pencil on paper. In many cases, such print is used for temporary information storage such as phone numbers, reminders, grocery lists, and appointments. Print media for such print commonly consists of notepads, Post-It® notes, calendars, tear-sheet display boards, and the like. In each instance, the medium is usually used for its intended purpose then later discarded or ignored, leading to waste, recycling costs, and clutter.

Chalk-on-chalkboard and dry marker pen-on-whiteboard print overcome issues of media waste and clutter. Such print images are produced with powders or inks that coat the media surface without permanent attachment, allowing easy image viewing, erasing, and subsequent re-imaging. However, such print is not applicable to portable media applications, such as grocery lists, bound image applications, or other uses in which the media surface may be smeared by contact. A further disadvantage is the messy residue that results from the removal of the chalk or ink from the media surface.

Business printers, such as the ubiquitous laser and ink-jet printers, in connection with the Internet overcome some of these problems and provide contemporaneous information distribution with an attendant hard copy printing availability, but at a higher cost per page and usually at a lower quality or in a different format than commercial print. (The term Internet is used herein as a generic term for a collection of distributed, interconnected networks (ARPANET, DARPANET, World Wide Web, or the like) that are linked together by a set of industry standard protocols (e.g., TCP/IP, HTTP, UDP, and the like) to form a generally global, distributed network. (Private and proprietary intranets are also known and are amenable to conforming uses of the present invention.)

Computers, on the other hand, provide virtually instantaneous distribution of content through the Internet at significantly reduced cost to the reader. Similarly, with the advent of handheld devices such as palmtop computers, electronic books, net-ready telephones, and "personal digital assistants" (PDAs), print can be generated on electronic displays of varying sizes and types. Computer displays, however, provide far less comfortable readability by displaying content at significantly lower resolution than hard copy media. Cathode ray tube ("CRT") displays have greater resolution capability but have low portability, if any, and require substantially stationary body positioning and reading at a somewhat fixed focal length, leading to comparatively rapid eye strain and posture discomfort. Liquid crystal displays ("LCD") generally used in portable computers allow somewhat greater portability, but at the expense of display contrast, off-axis viewability, and higher cost. In part, the lower resolution of portable displays stems from the difficulty of matrix addressing at higher resolution.

FIG. 1AA (Prior Art) exemplifies the basic operation of a flat panel electronic display, such as a commercially available, flat panel, LCD 1 (dashed lines are used in this drawing to indicate continuation of discrete elements of the apparatus so as to make the drawing less complicated). Basically, the LCD 1 includes a plurality of picture elements ("pixels") defining the resolution of the display, generally formed by an array of thin film transistors ("TFT") and too small to be seen in this FIGURE (e.g., 600 dots per inch ("dpi"). A plurality of gate lines 2 and data lines 3 form a pixel control grid for active area "B" of the panel 1. The gate lines 2 and data lines 3 extend as leads 5 outside of the active area B for connection to known manner integrated circuit drivers. A plurality of pads, one for each line, are formed in region "C" about the periphery of the active area B as discrete pad regions 4 are coupled by the leads 5 to the gate and data lines 2, 3. Color LCD is produced by backlighting the individually switched pixels crystals through color filters. Note importantly that the resolution of the screen is limited by the technology related to interconnect wiring—namely, between the gate and data lines and the microprocessor or memory sending data—and driver size for each pixel. Moreover, such a device requires power to maintain each pixel in its current state and continually to backlight the crystal screen.

The at least one order of magnitude lower resolution of computer displays in comparison to commercial hard copy commonly prevents the reader from seeing a full-page comparable document at one time. Moreover, because of screen size constraints, without a very large video monitor or shrinking the page to fit a screen, the reader must use manual controls to scroll the displayed image down the document page in order to read its entire content. Furthermore, graphic images often can not fit on a single screen without severe zoom-out reduction in size, limiting the detail which can be displayed. Still further, there is the requirement of booting-up the computing device, turning on the specific application (notepad, calendar, or the like), and making at least one user command entry to obtain a document page of interest. More often than not, rather than using a PDA to make a note, a simple note scribbled on a piece of paper is much more convenient.

In addition to the aforementioned shortcomings of electronic displays, such displays are relatively high in power consumption, particularly if the screen is of the active transistor type. Also, they suffer from relatively poor contrast (viewability) in outdoor or other bright ambient environment conditions. Emissive displays, such as CRT, plasma, light emitting diode ("LED"), and backlit LCD, have self-illuminated picture elements ("pixels"). Emissive displays have excessive power consumption by virtue of the need to produce light. Such self-illumination is still comparatively low in brightness and therefore appears dark in bright ambient viewing conditions due to the eye's automatic adaptation to the ambient brightness. Non-backlit LCDs have poor contrast under virtually all ambient illumination; the ambient light reflected from each LCD pixel must pass through polarizers that significantly reduce pixel brightness relative to ambient brightness. This makes the LCD appear dark and of poor contrast. Prior art electronic displays used in computers and televisions have therefore been limited to practical use under controlled office and home ambient illumination. With the advent of mobile computer appliances, such as web-based telephones, palm-top computers, and televisions, there is a growing need for display technologies that provide good viewability under the wider range of ambient illumination conditions in which users commonly communicate, do business and are entertained. Mobile appliances demand low power consumption for long battery life. Therefore, there is a growing need for an alternative to conventional electronic displays that consume less power.

When a long document is downloaded from the Internet, the reader will commonly print the contents to gain back the aforementioned hard copy media benefits. Such printing, however, adds local cost to the process for documents that commonly are still read just once and eventually discarded. The recycling of paper barely makes a dent in the multiple costs to the environment. For information distribution, current computer solutions are, thereby, still somewhat antithetical to the needs for distribution of books, periodicals such as magazines and newspapers, and the like.

Electrostatically polarized, bichromal particles for displays have been known since the early 1960's. The need for an electronic paper-like print means has recently prompted development of at least two electrochromic picture element (pixel) colorants: (1) a microencapsulated electrophoretic colorant (see e.g., U.S. Pat. No. 6,124,851 (Jacobson) for an ELECTRONIC BOOK WITH MULTIPLE PAGE DISPLAYS, E Ink Corp., assignee), and (2) a field rotatable bichromal colorant sphere (e.g., the Xerox® Gyricon™). Each of these electrochromic colorants is approximately hemispherically bichromal, where one hemisphere of each microcapsule is made the display background color (e.g., white) while the second hemisphere is made the print or image color (e.g., black or dark blue). The colorants are field translated or rotated so the desired hemisphere color faces the observer at each pixel. FIGS. 1BB and 1CC schematically depict this type of prior art.

Electronic ink is a recent development. E Ink Corporation (Cambridge, Mass.; www.eink.com) provides an electronic ink in a liquid form that can be coated onto a surface. Within the coating are tiny microcapsules (e.g., about 30 $\mu$m to 100 $\mu$m in diameter, viz. about as thick as a human hair, thus quite visible to the naked eye). As illustrated in FIG. 1BB (Prior Art), each microcapsule 6 has white particles 7 suspended in a dark dye 8. When an electric field is applied and sustained in a first polarity, the white particles move to one end of the microcapsule where they become visible; this makes the surface appear white at that spot. A carrier 9 is provided. An opposite polarity electric field pulls the particles to the other end of the microcapsules where they are substantially hidden by the dye; this makes the surface appear dark at that spot.

The Xerox Gyricon sphere is described in certain patents. FIG. 1CC (Prior Art) is a schematic illustration of this type of sphere. U.S. Pat. No. 4,126,854 (Sheridon '854) describes a bichromal sphere having colored hemispheres of differing Zeta potential that allow the spheres to rotate in a dielectric fluid under influence of an addressable electrical field. U.S. Pat. No. 4,143,103 (Sheridon '103) describes a display system using bichromal spheres in a transparent polymeric material. U.S. Pat. No. 5,604,027 (Sheridon '027), issued Feb. 18, 1997, for SOME USES OF MICROENCAPSULATION FOR ELECTRIC PAPER, describes a printer. Essentially, each sphere 10 (again, about 30 $\mu$m in diameter) has a bichromal ball 13 having two hemispheres 11, 12, typically one black and one white, each having different electrical properties. Each ball is enclosed within a spherical shell 14 and a space 15 between the ball and shell is filled with a liquid to form a microsphere so that the ball is free to rotate in response to an electrical field. The microspheres can be mixed into a substrate which can be formed into sheets or can be applied to a surface. The result is a film which can form an image from an applied and sustained electrical field. Currently, picture element ("pixel") resolution using this Gyricon spheres is limited to about 100 dpi.

Thus, in the known prior art, each individual colorant device is roughly hemispherically bichromal; one hemisphere is made the display background color (e.g. white) while the second hemisphere is made the print or image color (e.g. black or dark blue). In accordance with the text and image data, these microsphere-based colorant devices are field translated or rotated so the desired hemisphere color faces the observer at each respective pixel. It can be noted that, in commercial practice, displays made from these colorants have relatively poor contrast and color. The layer containing the microcapsules is generally at least 3 or 4 microcapsules thick. Light that penetrates beyond the layer surface internally reflects off the backside hemispheres causing color (e.g. black and white) intermixing. The image is, for example, thus rendered dark gray against a light gray background. Thus, these technologies do not provide a promising extendability and scaling to high resolution color displays because the colorant switches only between two opaque colors, disallowing passage of light from different colorant layers for a given pixel. Still further, as is these colorant technologies produce a visually poor display resolution relative to hard copy print due to the relatively large size of the colorant microcapsule spheres. Moreover, the spheres are bichromal, limiting application to two-color rather than true full color display. Further still, the need for overlapping spheres in multiple layers to achieve adequate color density limits pixel resolution Yet another limitation is that these colorant technologies suffer from poor pixel switching times in comparison to standard CRT and LCD technology. Each technology relies on the electrophoretic movement of colorant mass in a dielectric material, such as isoparafin. The color rotation speed of dichroic spheres under practical electrical field intensities is in the range of 20 milliseconds (ms) or more. At that rate, a 300 dpi resolution printer employing an electrode array would be limited to under one page per minute print speed. These large sphere colorants require high switching voltages (e.g. 80–200 volts) to obtain adequate fields through the consequently thick (>100 $\mu$m) carrier-colorant layer. Such switching voltages add high cost to the pixel drive electronics, similar to that of the high-end matrix LCD apparatus. Thus, those involved in the development of microcapsule type colorants are struggling with the resolution of these and other related problems rather than focusing on a new molecular level technology as described in accordance with the present invention.

There are limitations to microcapsule technologies. The Gyricon microcapsule technology produces limited resolution compared to hard copy due to the relatively large size of the microcapsule spheres, typically a diameter greater than 30 $\mu$m. As schematically illustrated in FIG. 1DD (Prior Art), overlapping spheres in multiple layers are needed to achieve adequate color density, limiting pixel resolution to the order of 300–400 dots-per-inch ("dpi"), whereas, depending on the viewing conditions, the unaided human eye can discriminate to over 1000 dpi. Displays made from microcapsules tend to have poor contrast and color because light that penetrates beyond the surface layer of microcapsules reflects back off subjacent microcapsules causing color intermixing. As also demonstrated in FIG. 1DD, poor image contrast arises from backside reflections from each microcapsule. Light entering and penetrating the interstices of a first layer of microcapsules (now illustrated as hemispherically colored black and white circles 8) in the media surface coating 16 reflects and is absorbed by the backside, as well as front side, hemispheres of subsequent microcapsule layers. Low color density areas of the image become darker and high color density areas become lighter than would otherwise occur if the microcapsules were of uniform color throughout their exterior (as is true with pigments and dyes used in standard printing processes). Thus, in a device using layers of bichromal microcapsules, the image is often actually rendered dark gray against a light gray background Another limitation to achieving high contrast is that the microcapsules of the type shown in FIG. 1BB superimposes the two encapsulated components so that independently of which colorant faces the observer, the second colorant is also visible. Because of the finite nature of the white particles 7 and dark color dye 8, when the white hemisphere is displayed (rotated toward the viewer), dye will still show in the interstitial spaces between the white particles; likewise, when the dye hemisphere is displayed, the inherent transparent nature of the dye allows reflection toward the viewer off the subjacent white particles, lightening the dye color (e.g., deep blue to a medium blue). In other words, neither one hundred percent reflection of white nor one hundred percent of absorption is achieved. Of the type of microcapsule as illustrated in FIG. 1CC, while the hemispheres are opaque black and opaque white, respectively, when light hits the ball 13 it also goes between the spheres 10 similarly to as shown in FIG. 1DD, again limiting contrast and resolution capability.

Furthermore, because they rely upon the electrophoretic movement of a mass in a liquid, these microcapsule technologies suffer from poor pixel switching times in comparison to standard CRT and LCD screens. Color switching comprises the relative rotational or translational movement of solid particles and liquid from the forward facing to backside facing hemispheres. Relatively slow color switching time is the simple result of the microcapsule's mass and fluidic drag within the sphere. The combined mass and fluidic drag define the time required to affect a color switch at a given pixel. This, in turn, defines both the switching energy requirements and the imaging speed, or "throughput," of a printer using media with this technology.

Further still, these relatively large microcapsules require high switching voltages (e.g., 20–200 volts) to obtain adequate fields through the relatively thick (greater than 100 $\mu$m), multiple microcapsule layers 16. Such switching voltages add further cost to the pixel drive electronics, making it comparable to the cost of an LCD screen.

Still further, these microcapsule technologies do not provide a promising extension to high resolution color displays because the colorant switches only between two opaque colors, disallowing passage of light from different colorant subjacent layers for a given pixel. In other words, microcapsule colorant is not a true dye where outside the particular dye absorption bandwidth the colorant becomes transparent, allowing different layered chemical compositions to render full color images (e.g., as used in color film and print technology). Thus, to gain a full color adaptation, microcapsule colorant based devices will be limited to mosaic patterning which further limits resolution and, ultimately, print quality.

Moreover, the microcapsules themselves suffer from difficult manufacturing processes and relatively poor durability. Microcapsules, by their nature, have thin walls that are subject to breakage with subsequent liquid leakage that destroys colorant functionality. Wall thickness is typically of the order of 1–2 $\mu$m (or about 10% of diameter). Microcapsule breakage may occur by pressure externally applied to the media surface, media folding, and by the coating process itself used to make the media. This limits the ability of the display media to be folded or even contacted without a high probability of capsule breakage and subsequent loss of imaging function.

It can be concluded that there is not a currently available electronic information-displaying mechanism which does not have at least some of the foregoing described limitations. More particularly with respect to the present invention, among the collection of present print and display state-of-the-art technologies there does not exist a rewritable media capable of commercial hard copy resolution, contrast, and durability. Further, there is not a rewritable media that has the full color quality appearance nor print readability of commercially printed paper. Thus, there is a need for new and improved print media.

Still further, there is not an electronic rewritable media having good bright ambient illumination viewability and low power consumption.

Still further in the state-of-the-art, for digital data, mass storage media is another form of "rewritable media." Conventional mass storage media includes disks and tapes having a magnetic surface coating. The surface coating used in disks and tapes generally contains a thin film deposition, or polymer suspension, ferromagnetic crystal layer. When exposed to an externally applied magnetic field, the ferromagnetic crystals develop a residual magnetic field that remains stable in the absence of the external field. The surface coating is written for data storage by a magnetic writing head translated (by disk revolving or tape streaming) relative to the surface coating. Data is stored in the form of patterns of residual magnetic fields over the surface. The data is retrieved by a magnetic read head (e.g., an electric coil) translated relative to the encoded coating surface, transforming the residual magnetic field patterns into an oscillating electrical current stream representing the original electronic data form. The area density and field strength of the magnetically recorded data is determined by the size of the ferromagnetic crystal domains. In an alternate form, digital data is stored on CD-ROM media in the form of a pattern of laser-ablated or impressed pits on the surface of a light reflective disk. The data is read optically as the disk rotates by reflecting light off the surface into a light sensor. The sensed signal changes as it alternately strikes pits and reflective regions between successive pits. The density of data storage on the disk is a function of the size of the ablated pits and intervening reflective regions. In general, data can be read from a CD-ROM at a significantly greater rate than data can be written, since writing requires physical ablation of material in making pits. However, at present, writable CD technology is in its infancy and quality apparatus is relatively expensive.

With the ever-increasing need to store more data on storage media, there is increasing need for rewritable storage data storage elements that are much smaller than available through conventional magnetic and CD-ROM media, creating a higher data density capability. There is also a need to write data at higher data rates.

There is a need for a new technology for the field of displaying information that is adaptable to a wide range of implementations. Molecular science holds the promise for solution to many, if not all, of the shortcomings of the conventional methods and apparatus currently available for erasable writing and data storage, retrieval and display. Thus, the present invention provides molecular level solutions, viz., molecular systems in the form of molecular level optical switches, that can be assembled easily to make displays, electronic books, rewritable media, electronic lenses, electrically-controlled tinting for windows and mirrors, optical crossbar switches for fiber optic communications, and much more.

Due to the nature of the present invention which reaches into molecular science technology, it will become apparent to the reader that there also arises a question as to what is "print media" and what is a "writing surface" and what is a "display screen" (more simply "display" or "screen" as best fits the context). In some implementations, discriminating as to which conventional definition such an apparatus or method of use falls into may be less than clear. Therefore, it should be noted that no limitation on the scope of the present invention is intended by the use of such a particular conventional term when describing the details and no such limitation should be implied therefrom. Thus, further limitations regarding convention displays is appropriate to understanding the need for and objects and advantages of the present invention.

BRIEF SUMMARY OF THE INVENTION

In its basic aspect, the present invention provides a colorant for a substrate, the colorant including: a molecular system, said system including electrochromic, switchable molecules, each of said molecules being selectively switchable between at least two optically distinguishable states, wherein said system is distributable on the substrate thereby forming an erasably writable surface. In another aspect, the present invention provides a writeable-erasable coating for a substrate, including: a carrier; and within said carrier, a composition including electrochromic switchable molecules, each of said molecules being selectively switchable between at least two optically distinguishable states, wherein said molecules are distributable on the substrate thereby forming an erasably writable surface. Another aspect of the invention is an erasable writing medium including: a substrate; and at least one layer of a molecular colorant coating affixed to said substrate, wherein molecules of the coating are at least bichromal and selectively switchable between color states under influence of a localized electric field. Still another aspect of the invention is a method for writing on electrical field addressable rewritable medium including: providing a substrate having at least one layer of a molecular colorant coating wherein molecules of the coating are at least bichromal and subjectable to switching between color states under influence of a localized electric field and wherein said layer is distributed across said substrate forming pixels on said medium; and electrically addressing pixels by selectively controlling each said localized electric field to form document content on said medium. Another aspect of the present invention is a data storage device including: a substrate; and at least one layer of a molecular colorant coating wherein molecules of the coating are at least bichromal and subject to bistable switching between at least two electro-optical states under influence of a localized electric field. Still another aspect of the present invention is a method of fabricating rewritable media including: providing a substrate; and forming with said substrate, a rewritable layer wherein the writable-erasable layer is formed by a molecular system, said system including electrochromic switchable molecules, each of said molecules being selectively switchable between at least two optically distinguishable states.

It is an important advantage and novel feature of the present electronic media that rendered images are of a quality as good as or better than conventional, very high resolution, ink-on-paper and can be rendered as good as any photographic print.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings.

BRIEF DESCRIPTION OF THE DRAWINGS

In accordance with 37 C.F.R. 1.84(u), in order to prevent confusion with FIGURES of the Appendix hereto, the drawings of this application use double capital letter suffices.

FIG. 1AA (Prior Art) is an elevation view schematic of an LCD screen apparatus.

FIG. 1BB (Prior Art) is an exemplary electronic ink device.

FIG. 1CC (Prior Art) is a schematic depiction of a Xerox Gyricon sphere.

FIG. 1DD is a schematic drawing illustrating the physics associated with the prior art as illustrated in FIGS. 1BB and 1CC.

FIG. 2AA is a schematic depiction in a magnified, perspective view of a unit of print media in accordance with the present invention.

FIG. 2BB is a magnified detail of FIG. 2AA.

Figure 3A:
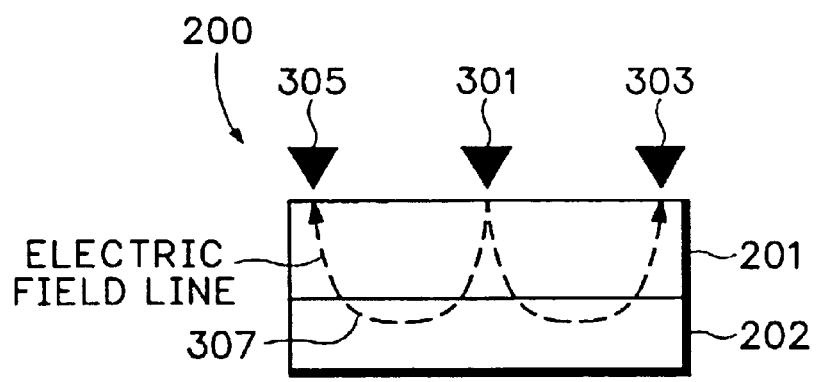
FIG. 3AA is a schematic drawing of a first method and apparatus for writing-erasing in accordance with the present invention as shown in FIGS. 2AA and 2BB.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable. Subtitles are used hereinafter merely for the convenience of the reader; no limitation on the scope of the invention is intended thereby nor should any such limitation be implied therefrom.

Definitions

The following terms and ideas are applicable to both the present discussion and the Appendix hereto.

The term "self-assembled" as used herein refers to a system that naturally adopts some geometric pattern because of the identity of the components of the system; the system achieves at least a local minimum in its energy by adopting this configuration.

The term "singly configurable" means that a switch can change its state only once via an irreversible process such as an oxidation or reduction reaction; such a switch can be the basis of a programmable read-only memory (PROM), for example.

The term "reconfigurable" means that a switch can change its state multiple times via a reversible process such as an oxidation or reduction; in other words, the switch can be opened and closed multiple times, such as the memory bits in a random access memory (RAM) or a color pixel in a display.

The term "bistable" as applied to a molecule means a molecule having two relatively low energy states (local minima) separated by an energy (or activation) barrier. The molecule may be either irreversibly switched from one state to the other (singly configurable) or reversibly switched from one state to the other (reconfigurable). The term "multi-stable" refers to a molecule with more than two such low energy states, or local minima.

The term "bimodal" for colorant molecules in accordance with the present invention may be designed to include the case of no, or low, activation barrier for fast but volatile switching. In this latter situation, bistability is not required, and the molecule is switched into one state by the electric field and relaxes back into its original state upon removal of the field; such molecules are referred to as "bimodal". In effect, these forms of the bimodal colorant molecules are "self-erasing". In contrast, in bistable colorant molecules the colorant molecule remains latched in its state upon removal of the field (non-volatile switch), and the presence of the activation barrier in that case requires application of an opposite field to switch the molecule back to its previous state. Also, "molecular colorant" as used hereinafter as one term to describe aspects of the present invention is to be distinguished from other chemical formulations, such as dyes, which act on a molecular level; in other words, "molecular colorant" used hereinafter signifies that the colorant molecules as described in the Appendix and their equivalents are employed in accordance with the present invention.

Micron-scale dimensions refers to dimensions that range from 1 micrometer to a few micrometers in size.

Sub-micron scale dimensions refers to dimensions that range from 1 micrometer down to 0.05 micrometers.

Nanometer scale dimensions refers to dimensions that range from 0.1 nanometers to 50 nanometers (0.05 micrometers).

Micron-scale and submicron-scale wires refers to rod or ribbon-shaped conductors or semiconductors with widths or diameters having the dimensions of 0.05 to 10 micrometers, heights that can range from a few tens of nanometers to a micrometer, and lengths of several micrometers and longer.

"HOMO" is the common chemical acronym for "highest occupied molecular orbital", while "LUMO" is the common chemical acronym for "lowest unoccupied molecular orbital". HOMOs and LUMOs are responsible for electronic conduction in molecules and the energy difference between the HOMO and LUMO and other energetically nearby molecular orbitals is responsible for the color of the molecule.

An "optical switch," in the context of the present invention, involves changes in the electromagnetic properties of the molecules, both within and outside that detectable by the human eye, e.g., ranging from the far infra-red (IR) to deep ultraviolet (UV). Optical switching includes changes in properties such as absorption, reflection, refraction, diffraction, and diffuse scattering of electromagnetic radiation.

The term "transparency" is defined within the visible spectrum to mean that optically, light passing through the colorant is not impeded or altered except in the region in which the colorant spectrally absorbs. For example, if the molecular colorant does not absorb in the visible spectrum, then the colorant will appear to have water clear transparency.

The term "omni-ambient illumination viewability" is defined herein as the viewability under any ambient illumination condition to which the eye is responsive.

As a general proposition, "media" in the context of the present invention includes any surface, whether portable or fixed, that contains or is layered with a molecular colorant or a coating containing molecular colorant in accordance with the present invention wherein "bistable" molecules are employed; for example, both a flexible sheet exhibiting all the characteristics of a piece of paper and a writable surface of an appliance (be it a refrigerator door or a computing appliance using the molecular colorant). "Display" (or "screen") in the context of the present invention includes any apparatus that employs "bimodal" molecules, but not necessarily bistable molecules. Because of the blurred line regarding where media type devices ends and display mechanisms begin, no limitation on the scope of the invention is intended nor should be implied from a designation of any particular embodiment as a "media" or as a "display."

As will become apparent from reading the Detailed Description and Appendix, "molecule" can be interpreted in accordance with the present invention to mean a solitary molecular device, e.g., an optical switch, or, depending on the context, may be a vast array of molecular-level devices, e.g., an array of individually addressable, pixel-sized, optical switches, which are in fact linked covalently as a single molecule in a self-assembling implementation. Thus, it can be recognized that some molecular systems comprise a super-molecule where selective domain changes of individual molecular devices forming the system are available. The term "molecular system" as used herein refers to both solitary molecular devices used systematically, such as in a regular array pixel pattern, and molecularly linked individual devices. No limitation on the scope of the invention is intended by interchangeably using these terms nor should any be implied.

General

As illustrated schematically in a magnified partial view in FIG. 2AA, electronic print media 200 in accordance with one embodiment of the present invention comprises an electrochromic coating 201 affixed superjacently to a backing 202 substrate. The media 200 of the present invention employs an electrochromic molecular colorant coating 201 layer (phantom line illustration is used to demonstrate that the layer can in fact be transparent as described hereinafter and also to denote that the layer is very thin, e.g., on the order of a few microns) that contains bistable, electrochromic molecules 203 (represented by greatly magnified dots) that undergo conformational changes as a result of application of an electric field that in effect changes selectively localized regions of this coating from one hue to another. In order to describe the invention, the electrochromic molecules themselves are depicted as simple dots 203 in FIG. 2BB; however, it should be recognized that there are literally millions of such molecules (in unlinked system terms) per cubic micron of colorant; this can be thought of also as millions of molecular optical switching devices per cubic micron of colorant in a linked molecular system.

Optionally, note that as the molecular colorant is spatially addressable at its molecular scale, the colorant molecules may be commingled with molecules of the substrate. Incorporated substrate coloration and fabrication processes are well known in the print media art.

Bichromal Molecules for Electrochromic Colorants

In order to develop a molecular colorant suitable for rewritable media, what is needed is a molecular system that avoids chemical oxidation and/or reduction, permits reasonably rapid switching from a first state to a second, is reversible to permit real-time or video rate writing-erasing applications, and can be adapted for use in a variety of optical devices.

The present invention introduces the capability of using molecules for optical switches, in which the molecules change color when changing state. This property can be used for a wide variety of write-read-erase devices or any other application enabled by a material that can change color or transform from transparent to colored. The present invention introduces several new types of molecular optical property switching mechanisms: (1) an electric (E) field induced rotation of at least one rotatable section (rotor) of a molecule to change the band gap of the molecule; (2) E-field induced charge separation or re-combination of the molecule via chemical bonding change to change the band gap; (3) E-field induced band gap change via molecule folding or stretching. These devices are generically considered to be electric field devices, and are to be distinguished from electrochemical devices.

The co-pending U.S. patent application, partially incorporated herein as the Appendix, by Zhang et al. for MOLECULAR MECHANICAL DEVICES WITH A BAND GAP CHANGE ACTIVATED BY AN ELECTRIC FIELD FOR OPTICAL SWITCHING APPLICATIONS, supra, describes in detail a plurality of embodiments of bichromal molecules which can be used in accordance with the present invention.

Figure 7A:
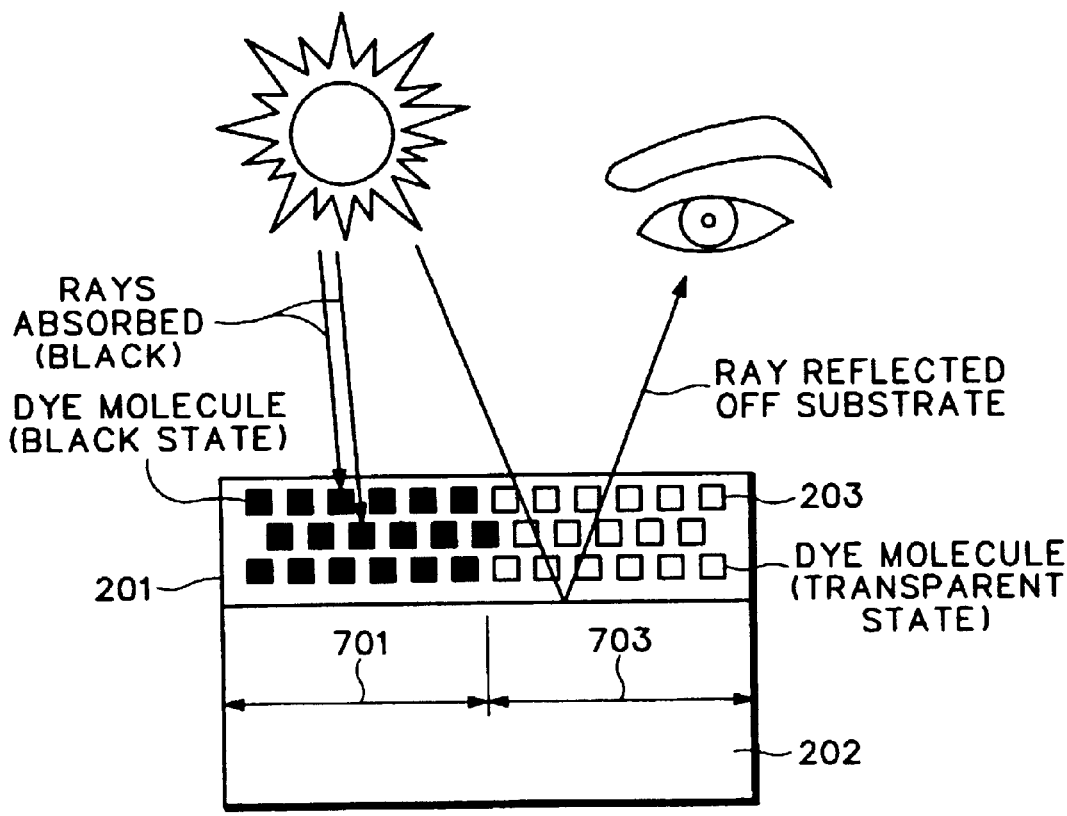
FIG. 7AA is a schematic drawing illustrating the physics associated with the present invention as shown in FIGS. 2AA–4AA for comparison to FIG. 1DD.

With respect to the technology as described in the Appendix, the overwhelming advantage of electrochromic molecular colorants over microcapsule technology (see, Background of the Invention, supra) for electronic print media is realization of standardized, conventional hard copy quality, print contrast, image resolution, switching speed, and color transparency. Such use of electrochromic molecular colorants will provide readable content that resembles conventional printing dyes on paper forms in color mode, color density, and coating layer incorporability. As depicted in FIG. 7AA, illustrating a stark contrast to the combined absorptionreflection physics of hemispheric microcapsule technology as depicted in FIG. 1DD, in the high color density state 701 (e.g., black), the electrochromic molecular colorant 201 absorbs light uniformly at all light incidence angles and locations to provide conventional ink color density. In the transparent state 703 (FIG. 7AA, right side), the bichromal molecules 203 of the present invention do not absorb any visible light appreciably, allowing a media substrate 202 to fully show through the coating layer 201. Thus, to the observer an electrochromic molecular colorant image appears substantially identical to the image as it would appear in conventional ink print on paper. Namely, gradations of the specific high density color, if any, are invisible to the naked eye. The term "electrochromic molecular colorant" as used herein is expressly intended to include a plurality of different colorant molecules blended to form a layer that can achieve a desired composite color other than the exemplary black state.

Note additionally, the electrochromic molecular colorant is spatially addressable at its molecular (Angstrom) scale, allowing far greater image resolution than the tens-of-microns-scale of microcapsule colorants. As mentioned above, the molecules may be bistable or bimodal. When bistable, for example in an implementation that appears to be a simple sheet of print media, a variety of printing operation solutions is available for pixel switching. While for a bistable molecular colorant in accordance with the present invention a holding E-field via an addressable matrix of electrodes is not necessary, nonetheless such a matrix may be used (such as for flash writing-erasing the entire sheet, then turning off the E-field to conserve power). For a bimodal, and thus self-erasing, implementation, an electrode array with a holding E-field is required. An exemplary, molecular wire adaptable for printing pixels is described by Kuekes et al. in U.S. Pat. No. 6,128,214 for a MOLECULAR WIRE CROSSBAR MEMORY (assigned to the common assignee herein and incorporated herein by reference).

Further, the color switching time for the electrochromic molecular colorant pervaded pixel regions of the media 200 is significantly shorter than that for microcapsule colorants, allowing significantly faster imaging speeds, in the main because the electrochromic molecules of the colorant are substantially stationary and change color either through the movement of electrons, the twisting of molecular elements, or both. In each case, the total mass in movement for any addressed pixel is many orders of magnitude smaller than that required with microcapsule colorants; note also that there is additionally no viscous drag component.

Still further, electronic media 200 containing the electrochromic molecular colorant coating layer(s) as described in detail hereinafter have the durability of print on conventional media and are not subject to colorant breakage through externally applied pressure in manufacture or use as is media coated with microcapsule colorants.

Thus, it is an advantageous feature of the present invention to have a colorant material layer, comprising the bichromal molecules in a form to use as a coating, or film, for adaptable rewritable surfaces. It is another advantageous feature of the present invention to provide a liquid form of the molecular colorant used to fabricate rewritable media, including fixed surfaces.

Electric Field Addressable Rewritable Media Using Bichromal Colorant

Turning now to FIGS. 2AA, 2BB, in a first embodiment the present invention comprises an electrical field addressable, rewritable media 200 using a bichromal electrochromic molecular colorant. As the colorant is active at a molecular level, it may be formed in a number of ways. Embodiments that are self-assembling, formed using impregnation, or a coating with a liquid, paint, ink, or as an otherwise adapted form liquid vehicle on a substrate 202, are all within the scope of the invention. The molecular colorant may be a self-assembling system or have a carrier or vehicle for applying the colorant to a substrate using conventional deposition and drying (or curing) techniques. The various types of vehicles are discussed in more detail hereinbelow.

The present media 200 invention contemplates a wide variety of substrate 202 materials and forms. As merely one example directed toward printer and plain paper-like application uses, the coating 201 may be affixed onto a plastic or other flexible, durable, material substrate 202 in the approximate size, thickness, and shape of commercial stationery or other printable media (see also, U.S. Pat. No. 5,866,284 by Kent D. Vincent, filed on May 28, 1997, for a PRINT METHOD AND APPARATUS FOR RE-WRITABLE MEDIUM; see also U.S. patent application Ser. No. 09,172, 929 (HP docket no. 10010539) also by Vincent TL.). The particular substrate 202 composition implemented is fully dependent on the specific application and, particularly, to the role that the substrate plays in supporting or creating the electric field that is imposed across the coating 201 layer. In fact, the molecular coating, at least in a bistable molecular system form, can be used with any surface upon which writing or images can be formed.

The Molecular System Erasably Writable Surface

In a preferred embodiment related to the present invention, a coating layer 201 of the media 200 comprises electrochromic molecules 203 (FIGS. 2AA–2BB)—self-assembling or molecules in association with another chemical component, the "vehicle"—having an electrical field responsive high color density state (hereinafter simply "color state") and a transparent state, or two highly contrasting color states, e.g., a black state and a color state (e.g., yellow). The vehicle may include binders, solvents, flow additives, or other common coating additives appropriate for a given implementation.

Preferably, the colorant of the coating 201 obtains a color state (e.g., black) when subjected to a first electrical field and a transparent state when subjected to a second electrical field. The coating 201—or more specifically, the addressable pixel regions of the media 200—in a preferred embodiment is bistable; in other words, once set or written, the field targeted, "colored pixel," molecules form the "printed content," remaining in the current printed state until the second field is applied, intentionally erasing the image by returning the molecules to their transparent state at the field targeted pixels. Again, it must be recognized that there may be millions of such switched molecule in any given pixel. No holding electrical field is required to maintain the printed content.

Alternately, the colorant may be monostable, obtaining a localized, first color state (e.g., transparent) when subjected to a localized electrical field, then configuratively relaxing to a second color state (e.g., black) in the absence of the field, i.e., bichromal and self-erasing.

Although very different in constitution, the coating composition of this invention is analogous to conventional coating formulation technology. The constituents of the colorant will depend on the rheology and adhesion needs of the printing/coating process and substrate material. In some implementations, the colorant strata will be self-assembling. Typically, the coating 201 layer will compose 1%–30% of the solid content of the film deposited to form the coating 201 layer on the substrate 202. This amount is usually determined by desired image color density. The coating 201 may include a polymeric binder to produce a dried or cured coating 201 layer on the substrate 202 in which the electrochromic molecular colorant is suspended. Alternatively, the solids content may include as much as 100% colorant for certain known manner evaporative deposition methods or other thin film deposition methods wherein the colorant, or an associated vehicle, is deposited. In the case of deposition-evaporation methods, there may be no associated vehicle. In some instances, the colorant must be pre-oriented within the deposited coating 201 layer to allow an optimum alignment with the electrical field that will be used to write and erase a printed content. Such orientation may be achieved by solidifying the deposited coating 201 layer under the influence of a simultaneously applied electric field across the media 200. In one specific embodiment, the coating 201 comprises electrochromic molecular colorant and a liquid, ultraviolet light ("UV") curable, prepolymer (e.g., (meth) acrylate or vinyl monomers/oligomers). The polymer in this instance is formed in situ on the media substrate 202 when subjected to ultraviolet radiation. Such prepolymers are well known in the coatings art.

In a second specific embodiment, coating solidification may occur through thermally activated vehicle chemical reaction common to epoxy, urethane, and thermal free radical activated polymerization.

In a third specific embodiment, coating solidification may occur through partial or total vehicle evaporation.

The colorant may also self-orient through colorant/coating design that allows a self-assembled lattice structure, wherein each colorant monomer aligns with adjacent colorant monomers. Such design and lattice structures, for example, are common to dendrimers and crystals. Processes for self-assembly may include sequential monolayer deposition methods, such as well known Langumir film and gas phase deposition techniques.

The Substrate

Figure 4A:
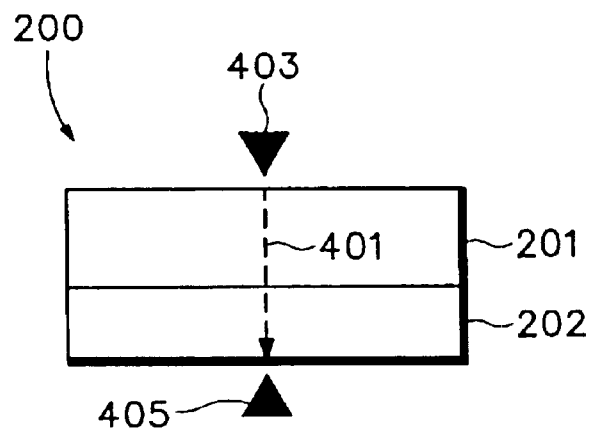
FIG. 4AA is a schematic drawing of a second method and apparatus for writing-erasing in accordance with the present invention as shown in FIGS. 2AA and 2BB.

The construction of any specific implementation of the media is dependent upon the writing means, such as are schematically represented in FIGS. 3AA, 4AA, and 5AA, described in more detail hereinafter. In co-pending applications, the assignee has provided Detailed Description of writing instruments and apparatus for writing using the molecular colorant. For implementations using an electric field that is perpendicular to the surface of the media (see e.g., FIGS. 4AA and 5AA, the substrate 202 should be fabricated of a material having a dielectric constant and electrical conductivity which compliments that of the colorant coating 201 layer. Overall, the substrate may be flexible, semi-flexible, or rigid. It may comprise structures as a film, foil, sheet, fabric, or a more substantial, preformed, three-dimensional object. It may be electrically conductive, semiconductive, or insulative as appropriate for the particular implementation. Likewise, the substrate may be optically transparent, translucent or opaque, or colored or uncolored, as appropriate for the particular implementation. Suitable substrate materials for one-side electrode implementations such as demonstrated by FIG. 3AA may be composed, for example, of paper, plastic, metal, glass, rubber, ceramic, wood, synthetic and organic fibers, and combinations thereof. Suitable flexible sheet materials are preferably durable for repeated imaging, including for example resin impregnated papers (e.g. Appleton Papers Master Flex™), synthetic fiber sheets (e.g., DuPont™ Tyvex™), plastic films (e.g., DuPont Mylar™, General Electric™ Lexan™, and the like) elastomeric films (e.g., neoprene rubber, polyurethane, and the like), woven fabrics (e.g., cotton, rayon, acrylic, glass, metal, ceramic fibers, and the like), and metal foils. Suitable substrate materials for two-sided electrode applications as shown in FIGS. 4AA and 5AA may be composed from the same materials wherein it is preferable that the substrate be conductive or semi-conductive, have a conductive layer in near contact with the molecular colorant layer 201, or have a high dielectric constant bulk property to minimize voltage drop across the substrate. Conductive substrates include metals, highly conjugated conductive polymers, ionic polymers, salt and carbon filled plastics and elastomers, and the like. Suitable semi-conductive substrates may be composed of conventional doped silicon and the like. Substrates with a conductive layer include metal clad printed circuit board, indium tin oxide coated glass, ceramics, and the like. Vapor deposited or grown semiconductor films on glass, ceramic, metal or other substrate material may also be used. Each of these substrates are commercially available. High dielectric constant materials include metal-oxide ceramics such as titania. Suitable substrates may be composed of sintered ceramic forms, woven ceramic fabric, or ceramic filled plastics, elastomers and papers (via ceramic-resin impregnation). Translucent substrates may be used in applications where ambient illumination and backlit viewing options are made available on the same substrate. In general, it is desirable that the translucent substrate appear relatively opaque white under ambient viewing conditions and transparent white under backlit viewing conditions. Suitable translucent substrates include crystalline and semi-crystalline plastic, fiber sheets and film (e.g., Dupont Tyvex), matte-surfaced plastic films (e.g., DuPont matte-finish Mylar and General Electric matte-finish Lexan), commercial matte-surfaced glass, and the like.

Apparatus and Methodology

Turning now to FIG. 3AA, for an implementation such as a simple sheet of rewritable media or a mass data storage media (see Background, supra), or on other bistable molecular colorant coated surfaces where a holding field is not used, it is desirable to create an electrical writing field from a single coating side, for example with an electronic pen tip or electrode pair 301 and 303, or 301, 305, and to entrain the field across the coating 201 layer. In such instances, an appropriately low conductivity and dielectric constant colorant coating 201 is desirable to prevent field shunting within the coating layer. The electrical properties of the substrate 202 are less important with such fringe field (represented by dashed—arrow 307) type writing instruments.

For applications in which it is desirable to create the writing field (dashed—arrow 401) perpendicularly through the media 200 thickness, such as depicted in FIG. 4AA, with electrodes 403, 405 on opposing sides of the media, the substrate 202 preferably has a high dielectric constant, or high electrical conductivity if the adjacent electrode is common to all pixels. These properties minimize the voltage drop (loss) across the substrate 202 to minimize media switching voltage requirement. For example, employable substrates 202 are represented by the group: titania-filled plastic, certain high dielectric constant resin impregnated papers, and metals.

For certain implementations, e.g., large easel boards (note that molecular colorant based electronic displays and display screens, such as those used in computers, PDA's and the like are described in other co-pending applications by Vincent et al. and assigned to the common assignee herein), it is desirable to coat substrates having an electrode or array of electrodes included on the substrate surface to be coated. Representative substrates include metal-clad fiberboards, printed circuit boards, metalized glass, surface etched metalized glass, graphite impregnated rubbers and plastics, sheet metals, and the like.

Figure 5A:
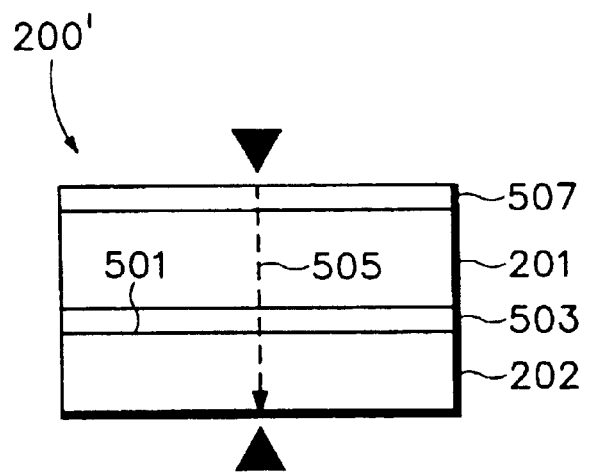
FIG. 5AA is an alternative embodiment of the present invention as illustrated by FIGS. 2AA–4AA.

Turning now to FIG. 5AA, in a more costly embodiment, the media 200' may include a substrate 202 having a reflective substrate 501 coated with a preferred background color layer 503, wherein the background color remains fixed and independent of the imposed electric writing fields (dashed—arrow 505). This surface 501 will normally create the background color of the media 200' when the molecular colorant coating 201 layer is switched to the transparent state. Such surface coatings generally comprise a conventional pigment or colorant incorporated in a polymer binder. As with the substrate 202, the surface 501 coating 503 comprises a binder and colorant of a composition chosen to maintain the integrity of the electric field 505 imposed on the media 200' and to minimize additional voltage drop across the media. Alternatively, a conventional pigment or colorant may be incorporated in the substrate 202 itself. Such surface coating and incorporated substrate coloration fabrication processes are well known in the media art.

The media 200' of the present invention may further include a protective surface 507 layer. In general, the protective surface layer 507 is visibly transparent and protects the colorant coating 201 from abrasion, photo-oxidative color fade, chemical decomposition, or other environmentally imposed factors that may alter the integrity of the media 200'. The protective surface layer 507 fabrication can be in a known manner, such as a polymeric coating, a transparent material deposition, or a laminate. As examples, polymethyl methacrylate and polyurethane type polymeric coatings are known to contain ultraviolet radiation absorbing additives; thin film, vapor deposited, glass; and polymer laminate films may be employed. Methods of layer application are also well known in the art. As with the substrate 202, the protective surface layer 507 is preferably composed to maintain the integrity of the electric field imposed on the media and to minimize additional voltage drop across the media.

The colorant coating 201 of any of the aforementioned media 200, 200' of this invention may comprise a mosaic pattern of alternating colorant molecule pixel regions that are common to the same coating plane. Such alternating colors may include, for example, a repeating pattern of cyan, magenta and yellow pixels. Mosaic patterns for color displays are well known in the display art and are useful to the present invention for producing color images. Achievable resolution is fine enough so that contiguous print content regions of a color can be attained in a manner that is substantially seamless to the naked eye. A number of printing processes are well suited for accurate deposition of each colored pixel in the mosaic. Such processes include: offset lithography, gravure, silkscreen, ink-jet, electrophotography, and photomask deposition. Ink-jet offers a particularly attractive mosaic deposition means from the viewpoint of small controlled dot shapes and placement in a non-contact deposition process. For most applications, the pattern of pixels in the mosaic must coincide with the pattern of electrodes constructed to drive each pixel. Furthermore, a mosaic pattern may also be formed by printing mosaic color pattern as background or by the use of conventional mosaic filters as part of, or adjacent to, a protective layer. The present embodiment shows use of black and transparent state molecules (see, e.g., FIG. 7) which can be used as a layer over a pre-printed color mosaic background (e.g., printed conventionally such as with a CYM ink-jet apparatus). No color shows through in the black switch state and color shows through in the transparent switch state. Likewise the use of a conventional color filter (e.g., as used in color LCD screens) for backlit or projection display use can be implemented; the back-transparent colorant molecules serves as a light valve similar to liquid crystal shutters. The benefit of each of these approaches is that it uses a single molecular colorant with conventional mosaic colorant (ink, filters). The color mosaic filter may optionally be printed as a background layer on an otherwise transparent substrate (e.g., glass). These approaches allow full color without inherent color, switched molecules (e.g., yellow/transparent state, and the like).

Importantly, because the colorant molecules can be implemented in an embodiment having a transparent state, colorant strata can be layered (e.g., molecules switching between transparent and primary colors in separate strata layers) such that very high resolution, full color rendering can be accomplished through multi-color layer pixel superposition (e.g., overlays of the subtractive primary colors cyan, magenta and, yellow); only in the present invention such implementations will be in fully rewritable formats. As noted in the Background section, this solves one of the limitations inherent in the microcapsule technologies.

The thickness and dielectric constant of each coating, layer and substrate component comprising the media 200, 200' of this invention is preferably selected to accommodate the spacing of opposing electrodes, field geometry, and voltage used to switch a given media pixel. The pixel resolution, as measured in pixels per linear dimension (e.g., 1200 pixels/inch ("ppi") for color, 4800 ppi for grey scale), is inversely proportional to the electrode spacing. The pixel switching voltage for the embodiment as shown in FIG. 5AA is equivalent to the sum of voltage drops over the respective layers that interpose the opposing electrodes. This is represented by the electrical schematic of FIG. 6AA. Each layer introduces a series capacitance with a voltage drop, "$V_n$," proportional to the layer thickness ("$d_n$") and inversely proportional to the layer dielectric constant ("$k_n$"), where "q"=the electronic charge (Coulombs) accumulated at an electrode, "$\epsilon$"=the permitivity constant, and "A"=coating layer surface area subjected to the field.

The substrate 202 generally represents a significant voltage drop and source for electrical field broadening if included within the electrode field. Thus, the substrate 202 is preferably a conductive material, thereby making an effective common ground plane electrode in applications such as FIGS. 4AA and 5AA that require the substrate to lie within the writing electric field. Metals and conductive and ionic polymers are good material choices in such instances. Alternatively, the substrate 202 may be composed of a high dielectric material to offset the voltage loss in an embodiment represented schematically by FIG. 4AA. Titania, or a like high dielectric filler, impregnated polymers, fiber-based papers, and plastics may be used for this purpose.

EXEMPLARY USEFULNESS

Erasably Writeable Media

The electrochromic molecular colorant system in accordance with the present invention may be described in part as an electrochromic molecular colorant allowing incorporation into virtually all types of inks, paints, coatings, and the like, where conventional colorants are commonly used. Further, it may be applied to a substrate using most any of the standard processes in which conventional pigments are used. These benefits are, again, in stark contrast to microcapsule colorants where the size and fragile nature of the microcapsules prevents both stable liquid dispersion and subjection to physical forces common to most standard application processes.

Solutions containing the electrochromic molecular colorant of the present invention may be, for example, spray, dip, roller, cast or knife coated onto large surfaces or webs of material, such as paper or plastic films to form the rewritable region of the surfaces or webs. Moreover, the adaptability of the molecular colorant of the present invention to standard application processing allows virtually any surface—for example, refrigerator doors, white boards, desktops, wristwatch surfaces, computer display fascia, or any surface on which note taking may be desirable—to be coated with the electric field rewritable electrochromic molecular colorant having the molecular colorant therein.

Using bistable, bichromal molecular colorant, such surfaces then may be written and erased with devices capable of producing a selectively localized electric field within the coating. Paper-like sheets, surface coated with the electrochromic molecular colorant of the present invention, may be imaged with printers capable of producing pixel-sized electric fields, for example, through an electrode array. These writing-erasing apparatus, devices, and methods of operation are the subject of other patent applications by Kent Vincent et al., Hewlett-Packard, assignee.

Inks or paints containing the present electrochromic molecular colorant may be selectively printed on various substrates, for example, to produce rewritable areas on a pre-printed form where the pre-printed areas are printed using non-erasable, conventional ink. Such rewritable areas may be printed with the molecular colorant using conventional offset lithography, gravure, intaglio, silkscreen, ink-jet processes, or the like.

Note that some such erasably writable areas may include backlighting, wherein the electrochromic molecular colorant ink is printed on a transparent substrate for overhead projection use, or may be printed on a white substrate for passive light viewing. In the backlit configuration, a mosaic of electrochromic molecular colorant pixels may be used as an active color filter for projection displays. In the passive light configuration, the mosaic of electrochromic molecular colorant pixels may form a stationary print-on-paper-like stationary. The electrochromic molecular colorant requires no passage of current and is, therefore, less subjected to display life reducing processes such as oxidation and charge trapping. Such passive light displays also offer better viewing under natural lighting conditions. Generally, the electrochromic molecular colorant requires far less drive energy than known electronic display means since it does not emit light or require backlighting. Further energy savings is realized through optional bi-stable colorant color states. Unlike liquid crystals, the bi-stable electrochromic molecular colorant does not require a field to hold a given image.

Data Storage Applications

The present invention electrochromic molecular colorant offers significant storage density, cost and write speed benefits over conventional ferromagnetic coating and CD-ROM storage media. The data storage element in this instance becomes a bi-stable, two electro-optical states molecule, or more accurately an approximate molecule-wide, or larger, column of layered molecules, that is written through a selectively localized electric field and read optically or by electric field sensing. Optical reading electrical field sensing applications are well known in the art. The molecular storage element provides significant storage density advantage over the much larger magnetic crystal or laser readable pit storage elements. The electrochromic molecular colorant may be incorporated in a polymer resin and inexpensively coated on standard storage media substrates using most any standard continuous thick film coating method. Thin film deposition coating methods may also be used. Depending on colorant structure and bi-stability, the bit writing time is expected to range between $10^{-3}$ and $10^{-9}$ seconds (based on computer simulations).

SUMMARY

The present invention provides an electrochromic molecular colorant 201 and a plurality of uses as an erasably writeable medium 201. Multitudinous types of substrates, such as paper, 202 are adaptable for receiving a coating of the colorant. Electrical fringe field 307 or through fields 401, 501 are used to transform targeted pixel molecules between a first, high color state 701 and a second, contrasting state or transparent state 703, providing information content having resolution and viewability at least equal to hard copy document print.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

A-1

APPENDIX

Molecules evidencing one of several new types of switching are provided for the colorant layer 101. That is to say, the present invention introduces several new types of switching mechanisms that distinguish it from the prior art:

(1) an electric field ("E-field") induced rotation of at least one rotatable section (rotor) or a molecule to change the band gap of the molecule;

(2) E-field induced charge separation or recombination of the molecule via chemical bonding change to change the band gap; and (3) E-field induced band gap change via molecular folding or stretching. Thus, the color switching is the result of an E-field induced intramolecular change rather than a diffusion or oxidation/reduction reaction, in contrast to prior art approaches. Also, the part of the molecule that moves is quite small, so the switching time is expected to be quite fast. Also, the molecules are much simpler and thus easier and cheaper to make than the rotaxanes, catenanes, and related compounds.

Figure 6A:
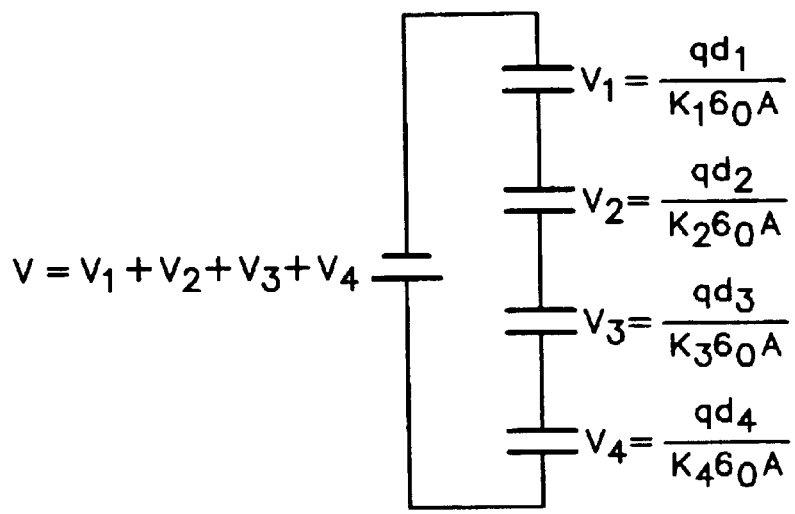
FIG. 6AA is an electrical schematic diagram in accordance with the present invention.

The following are examples of model molecules with a brief description of their function:

(1) E-field induced band gap change via molecular conformation change (rotor/stator type of model) - FIGS. 4 and 5a-5c;

(2a) E-field-induced band gap change caused by the change of extended conjugation via charge separation or recombination accompanied by increasing or decreasing band localization - FIG. 6a;

(2b) E-field-induced band gap change caused by change of extended conjugation via charge separation or recombination and π-bond breaking or formation - FIG. 6b; and (3) E-field-induced band gap change via molecular folding or stretching - FIG. 7.

Each model, with supporting examples, is discussed below. However, the examples given are not to be considered limiting the invention to the specific molecular systems illustrated, but rather merely exemplary of the above switching mechanisms.

Case 10013977

A-2

Model (1): E-Field-Induced Band Gap Change Via Molecular Conformation Change (Rotor/Stator Type of Model):

FIG. 4 is a schematic depiction of one embodiment of this model, which involves an E-field-induced band gap change via molecular conformation change (rotor/stator type of model). As shown in FIG. 4, the molecule 430 comprises a rotor portion 432 and a stator portion 434. The rotor portion 432 rotates with an applied electric field. In one state, depicted on the left side of the drawing, there is an extended conjugation through the entire molecule, resulting in a relatively smaller band gap and thereby longer wavelength (red-shifted) photo-absorption. In the other state, following rotation of the rotor, depicted on the right side of the drawing, the extended conjugation is changed, resulting in a relatively larger band gap and thereby shorter wavelength (blue-shifted) photo-absorption. FIGS. 5a-5c depict an alternate, and preferred, embodiment of this Model 1; these latter Figures are discussed in connection with Examples 1 and 2 of this Model 1 below.

The following requirements must be met in this model:

(a) The molecule must have at least one rotor segment and at least one stator segment;

(b) In one state of the molecule, there should be delocalized HOMOs and/or LUMOs ($\pi$-states and/or non-bonding orbitals) that extend over a large portion of the molecule (rotor(s) and stator(s)), whereas in the other state, the orbitals are localized on the rotor(s) and stator(s), and other segments;

(c) The connecting unit between rotor and stator can be a single $\sigma$-bond or at least one atom with (1) non-bonding electrons (p or other electrons), or (2) $\pi$-electrons, or (3) $\pi$-electrons and non-bonding electron(s);

(d) The non-bonding electrons, or $\pi$-electrons, or $\pi$-electrons and non-bonding electron(s) of the rotor(s) and stator(s) can be localized or de-localized depending on the conformation of the molecule, while the rotor rotates when activated by an E-field;

(e) The conformation(s) of the molecule can be E-field dependent or bi-stable;

A-3

(f) The bi-stable state(s) can be achieved by intra- or inter-molecular forces such as hydrogen bonding, Coulomb force, van der Waals force, metal ion complex or dipole inter-stabilization; and (g) The band gap of the molecule will change depending on the degree of non-bonding electron, or $\pi$-electron, or $\pi$-electron and non-bonding electron delocalization of the molecule. This will control the optical properties (e.g., color and/or index of refraction, etc.) of the molecule.

Following are two examples of this model (Examples 1 and 2):

The novel bi-modal molecules of the present invention are active optical devices that can be switched with an external electric field. Preferably, the colorant molecules are bi-stable. The general idea is to design into the molecules a rotatable middle segment (rotor) 432 that has a large dipole moment (see Examples 1 and 2) and that links two other portions of the molecule 430 that are immobilized (stators) 434. Under the influence of an applied electric field, the vector dipole moment of the rotor 432 will attempt to align parallel to the direction of the external field. However, the molecule 430 is designed such that there are inter- and/or intra-molecular forces, such as hydrogen bonding or dipole-dipole interactions as well as steric repulsions, that stabilize the rotor 432 in particular orientations with respect to the stators 434. Thus, a large electric field is required to cause the rotor 432 to unlatch from its initial orientation and rotate with respect to the stators 434.

Once switched into a particular orientation, the molecule 430 will remain in that orientation until it is switched to a different orientation, or reconfigured. However, a key component of the molecule design is that there is a steric repulsion or hindrance that will prevent the rotor 432 from rotating through a complete 180 degree half cycle. Instead, the rotation is halted by the steric interaction of bulky groups on the rotor 432 and stators 434 at an optically significant angle of typically between 10° and 170° from the initial orientation. For the purposes of illustration, this angle is shown as 90° in the present application. Furthermore, this switching orientation may be stabilized by a different set of inter- and/or intra-molecular hydrogen bonds or dipole interactions, and is thus latched in place even after the applied field is turned off. For bi- or multi-stable colorant molecules, this ability to latch the rotor 432 between two states separated by an optically significant rotation from the stators is crucial.

Case 10013977

A-4

The foregoing strategy may be generalized to design colorant molecules to provide several switching steps so as to allow multiple states (more than two) to produce a multi-state (e.g., multi-color) system. Such molecules permit the optical properties of the colorant layer to be tuned continuously with a decreasing or increasing electric field, or changed abruptly from one state to another by applying a pulsed field.

Further, the colorant molecules may be designed to include the case of no, or low, activation barrier for fast but volatile switching. In this latter situation, bi-stability is not required, and the molecule is switched into one state by the electric field and relaxes back into its original state upon removal of the field ("bi-modal"). In effect, these forms of the bi-modal colorant molecules are "self-erasing". In contrast, with bi-stable colorant molecules, the colorant molecule remains latched in its state upon removal of the field (non-volatile switch), and the presence of the activation barrier in that case requires application of an opposite field to switch the molecule back to its previous state.

When the rotor 432 and stators 434 are all co-planar, the molecule is referred to as "more-conjugated". Thus, the non-bonding electrons, or $\pi$-electrons, or $\pi$-electrons and non-bonding electrons of the colorant molecule, through its highest occupied molecular orbital (HOMO) and lowest unoccupied molecular orbital (LUMO), are delocalized over a large portion of the molecule 430. This is referred to as "a red-shifted state" for the molecule, or "optical state I". In the case where the rotor 432 is rotated out of conjugation by approximately 90° with respect to the stators 434, the conjugation of the molecule 430 is broken and the HOMO and LUMO are localized over smaller portions of the molecule, referred to as "less-conjugated". This is a "blue-shifted state" of the molecule 430, or "optical state II". Thus, the colorant molecule 430 is reversibly switchable between two different optical states.

It will be appreciated by those skilled in the art that in the ideal case, when the rotor 432 and stators 434 are completely coplanar, then the molecule is fully conjugated, and when the rotor 432 is rotated at an angle of 90° with respect to the stators 434, then the molecule is non-conjugated. However, due to thermal fluctuations, these ideal states are not fully realized, and the molecule is thus referred to as being "more-conjugated" in the former case and "less-conjugated" in the latter case. Further, the terms "red-shifted" and "blue-shifted" are not meant to convey any relationship to Case 10013977

A-5 hue, but rather the direction in the electromagnetic energy spectrum of the energy shift of the gap between the HOMO and LUMO states.

Examples 1 and 2 show two different orientations for switching the molecules. Example 1a below depicts a first generic molecular example for this Model 1.

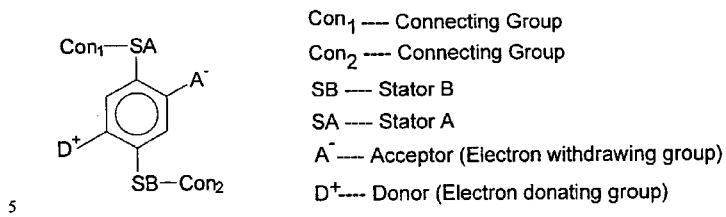

Con$_1$ —— Connecting Group
Con$_2$ —— Connecting Group
SB —— Stator B
SA —— Stator A
A$^-$ —— Acceptor (Electron withdrawing group)
D$^+$ —— Donor (Electron donating group)

Example 1a where:

The letter A$^-$ represents an Acceptor group; it is an electron-withdrawing group. It may be one of the following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional groups with at least one of above-mentioned hetero atoms (e.g., OH, SH, NH, etc.), hydrocarbons (either saturated or unsaturated) or substituted hydrocarbons.

The letter D$^+$ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters Con$_1$ and Con$_2$ represent connecting units between one molecule and another molecule or between a molecule and the solid substrate (e.g., metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

Case 10013977

A-6

The letters SA and SB are used here to designate Stator A and Stator B. They may be a hydrocarbon (either unsaturated or saturated) or substituted hydrocarbon. Typically, these hydrocarbon units contain conjugated rings that contribute to the extended conjugation of the molecule when it is in a planar state (red shifted state). In those stator units, they may contain the bridging group $G_n$ and/or the spacing group $R_n$. The bridging group (e.g., acetylene, ethylene, amide, imide, imine, azo, etc.) is typically used to connect the stator to the rotor or to connect two or more conjugated rings to achieve a desired chromophore. The connector may alternately comprise a single atom bridge, such as an ether bridge with an oxygen atom, or a direct sigma bond between the rotor and stator. The spacing groups (e.g., phenyl, isopropyl or tert-butyl, etc.) are used to provide an appropriate 3-dimensional scaffolding to allow the molecules to pack together while providing space for each rotor to rotate over the desired range of motion.

Example 1b below is a real molecular example of Model 1. In Example 1b, the rotation axis of the rotor is designed to be nearly perpendicular to the net current-carrying axis of the molecules, whereas in Example 2, the rotation axis is parallel to the orientation axis of the molecule. These designs allow different geometries of molecular films and electrodes to be used, depending on the desired results.

Case 10013977

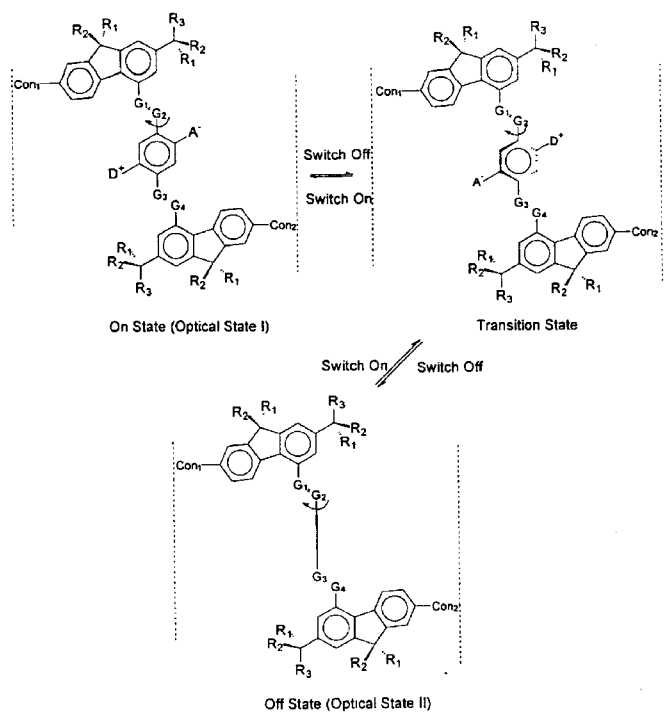
Example 1b
where:

A-8

The letter A⁻ is an Acceptor group; it is an electron-withdrawing group. It may be one of following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional group with at least one of above-mentioned hetero atoms (e.g., OH, SH, NH, etc.), hydrocarbon (either saturated or unsaturated) or substituted hydrocarbon.

The letter $D^+$ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters $Con_1$ and $Con_2$ represent connecting units between one molecule and another molecule or between a molecule and the solid substrate (e.g. metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

Letters $R_1$, $R_2$, $R_3$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbon (either saturated or unsaturated) or substituted hydrocarbon.

Letters $G_1$, $G_2$, $G_3$, and $G_4$ are bridging groups. The function of these bridging groups is to connect the stator and rotor or to connect two or more conjugated rings to achieve a desired chromophore. They may be any one of the following: hetero atoms (e.g., N, O, S, P, etc.) or functional groups with at least one of above-mentioned hetero atoms (e.g., NH or NHNH, etc.), hydrocarbons (either saturated or unsaturated) or substituted hydrocarbons. The connector may alternately comprise a single atom bridge such as an ether bridge with an oxygen atom, or a direct sigma bond between the rotor and stator.

Case 10013977

A-9

In Example 1b above, the vertical dotted lines represent other molecules or solid substrates. The direction of the switching field is perpendicular to the vertical dotted lines. Such a configuration is employed for electrical switching; for optical switching, the linking moieties may be eliminated, and the molecule may be simply placed between the two electrodes. They may also be simply used to link one molecule to another molecule or a molecule to an organic or inorganic solid substrate.

Referring to FIG. 5a, the molecule shown above (Example 1b) has been designed with the internal rotor 432 perpendicular to the orientation axis of the entire molecule 430. In this case, the external field is applied along the orientation axis of the molecule 430 as pictured - the electrodes (vertical dotted lines) are oriented perpendicular to the plane of the paper and perpendicular to the orientation axis of the molecule 430. Application of an electric field oriented from left to right in the diagrams will cause the rotor 432 as pictured in the upper diagram to rotate to the position shown on the lower right diagram, and vice versa. In this case, the rotor 432 as pictured in the lower right diagram is not coplanar with the rest of the molecule, so this is the blue-shifted optical state of the molecule, whereas the rotor is coplanar with the rest of the molecule on the upper diagram, so this is the red-shifted optical state of the molecule. The structure shown in the lower left diagram depicts the transition state of rotation between the upper diagram (co-planar, conjugated) and the lower right diagram (central portion rotated, non-conjugated).

The molecule depicted in Example 1b is chromatically transparent or blue-shifted. In the conjugated state, the molecule is colored or is red-shifted.

For the molecules in Example 1b, a single monolayer molecular film is grown, for example using Langmuir-Blodgett techniques or self-assembled monolayers, such that the orientation axis of the molecules is perpendicular to the plane of the electrodes used to switch the molecules. Electrodes may be deposited in the manner described by Collier et al, supra, or methods described in the above-referenced patent applications and issued patent. Alternate thicker film deposition techniques include vapor phase deposition, contact or ink-jet printing, or silk screening.

Example 2a below depicts a second generic molecular example for this Model 1.

Case 10013977

A-10

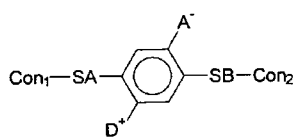

Con₁ ---- Connecting Group
Con₂ ---- Connecting Group
SB --- Stator B
SA ---- Stator A
A⁻ ---- Acceptor (Electron withdrawing group)
D⁺ ---- Donor (Electron donating group)

Example 2a where:

The letter A⁻ is an Acceptor group; it is an electron-withdrawing group. It may be one of following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional group with at least one of above-mentioned hetero atoms (e.g., OH, SH, NH, etc.), hydrocarbon (either saturated or unsaturated) or substituted hydrocarbon.

The letter D⁺ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters Con₁ and Con₂ represent connecting units between one molecule and another molecule or between a molecule and the solid substrate (e.g., metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

The letters SA and SB are used here to designate Stator A and Stator B. They can be a hydrocarbon (either unsaturated or saturated) or substituted hydrocarbon. Typically, these hydrocarbon units contain conjugated rings that contribute to the extended conjugation of the molecule when it is in a planar state (red shifted state). In those stator units, they may contain bridging groups $G_n$ and/or spacing groups $R_n$. A Case 10013977

A-11 bridging group is typically used to connect the stator and rotor or to connect two or more conjugated rings to achieve a desired chromophore The connector may alternately comprise a single atom bridge, such as an ether bridge with an oxygen atom, or a direct sigma bond between the rotor and stator. A spacing group provides an appropriate 3-dimensional scaffolding to allow the molecules to pack together while providing rotational space for each rotor.

Example 2b below is another real molecular example of Model 1.

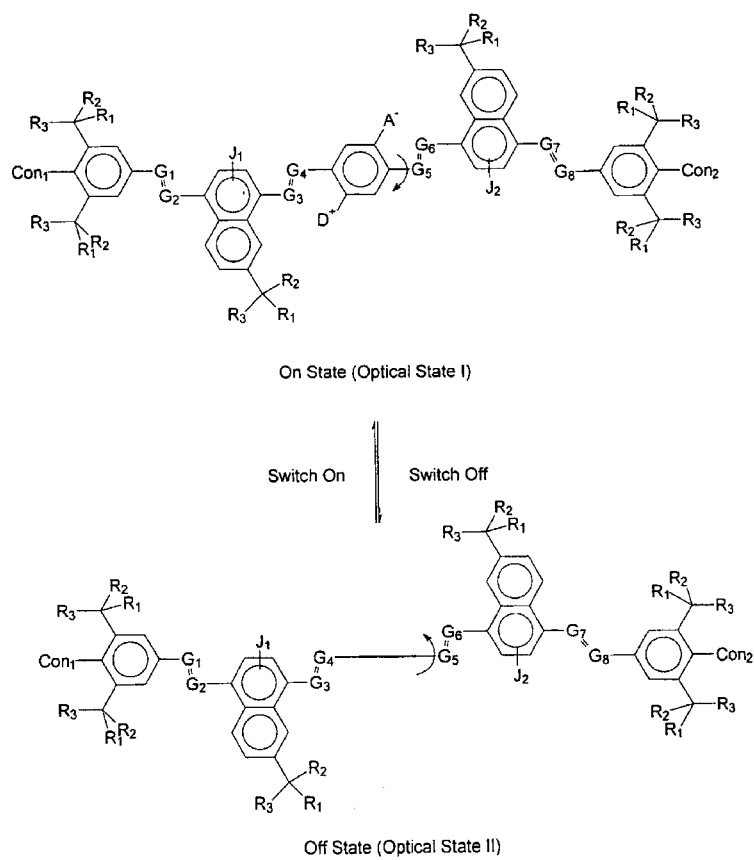

On State (Optical State I)

Switch On  Switch Off

Off State (Optical State II)

Case 10013977

A-12

Example 2b where:

The letter A⁻ is an Acceptor group; it is an electron-withdrawing group. It may be one of following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional group with at least one of above-mentioned hetero atoms (e.g., OH, SH, NH, etc.), hydrocarbon (either saturated or unsaturated) or substituted hydrocarbon.

The letter $D^+$ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters $Con_1$ and $Con_2$ represent connecting units between one molecule and another molecule or between a molecule and the solid substrate (e.g., metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

The letters $R_1$, $R_2$ and $R_3$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbon (either saturated or unsaturated) or substituted hydrocarbon.

The letters $G_1$, $G_2$, $G_3$, $G_4$, $G_5$, $G_6$, $G_7$, and $G_8$ are bridging groups. The function of these bridging groups is to connect the stator and rotor or to connect two or more conjugated rings to achieve a desired chromophore. They may be any one of the following: hetero atoms (e.g., C, N, O, S, P, etc.) or functional group with at least one of above-mentioned hetero atoms (e.g., NH or NHNH, etc.), hydrocarbons (either saturated or unsaturated) or substituted hydrocarbons. The connector may alternately Case 10013977

A-13 comprise a single atom bridge such as an ether bridge with an oxygen atom, or a direct sigma bond between the rotor and stator.

The letters $J_1$ and $J_2$ represent tuning groups built into the molecule. The function of these tuning groups (e.g., OH, NHR, COOH, CN, nitro, etc.) is to provide an appropriate functional effect (e.g. both inductive effect and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter- or intra-molecular interaction forces (e.g. hydrogen bonding, Coulomb interaction, van der Waals forces) or to provide bi- or multiple-stability of molecular orientations. They may be any one of the following: hydrogen, hetero atoms (e.g., N, O, S, P, B, F, Cl, Br, and I), functional groups with at least one of above-mentioned hetero atoms, hydrocarbons (either saturated or unsaturated) or substituted hydrocarbons.

The molecule shown above (Example 2b) has been designed with the internal rotor parallel to the orientation axis of the entire molecule. In this case, the external field is applied perpendicular to the molecular axis - the electrodes are oriented parallel to the long axis of the molecule and can be either nominally perpendicular or parallel to the plane of the above model structures. For example, application of an electric field to the upper molecule shown above where the field lines are perpendicular to the molecular axis and pointing upward will cause the rotor as pictured in that diagram to rotate to approximately 90 degrees and appear edge on, as shown in the lower molecular diagram above, and vice versa. In this case, the rotor as pictured in the lower diagram is not coplanar with the rest of the molecule, so this is the blue-shifted optical state of the molecule, or optical state II, whereas the rotor is coplanar with the rest of the molecule on the upper diagram, so this is the red-shifted optical state of the molecule, or optical state I. The letters N, H, and O retain their usual meaning.).

FIG. 5a depicts molecules similar to those of Examples 1b and 2b, but simpler, comprising a middle rotor portion 432 and two end stator portions 434. As in Examples 1b and 2b, the rotor portion 432 comprises a benzene ring that is provided with substituents that render the rotor with a dipole. The two stator portions 434 are each Case 10013977

A-14 covalently bonded to the benzene ring through an azo linkage, and both portions comprise an aromatic ring.

FIG. 5b is a schematic representation (perspective), illustrating the planar state, with the rotor 432 and stators 434 all co-planar. In the planar state, the molecule 430 is fully conjugated, evidences color (first spectral or optical state), and is comparatively more electrically conductive. The conjugation of the rings is illustrated by the π-orbital clouds 500a, 500b above and below, respectively, the plane of the molecule 430.

FIG. 5c is also a schematic representation (perspective), illustrating the rotated state, with the rotor 432 rotated 90° with respect to the stators 434, which remain co-planar. In the rotated state, the conjugation of the molecule 430 is broken. Consequently, the molecule 430 is transparent (second spectral or optical state) and comparatively less electrically conductive.

For the molecules of Example 2b, the films are constructed such that the molecular axis is parallel to the plane of the electrodes. This may involve films that are multiple monolayers thick. The molecules form solid-state or liquid crystals in which the large stator groups are locked into position by intermolecular interactions or direct bonding to a support structure, but the rotor is small enough to move within the lattice of the molecules. This type of structure can be used to build an E-field controlled display or used for other applications as mentioned earlier herein.

Model (2a): E-Field Induced Band Gap Change Caused by the Change of Extended Conjugation via Charge Separation or Recombination Accompanied by Increasing or Decreasing Band Localization:

FIG. 6a is a schematic depiction of this model, which involves an E-field-induced band gap change caused by the change of extended conjugation via charge separation or recombination accompanied by increasing or decreasing band localization. As shown in FIG. 6a, the molecule 630 comprises two portions 632 and 634. The molecule 630 evidences a larger band gap state, with less π-delocalization. Application of an electric field causes charge separation in the molecule 630, resulting in a smaller band gap state, with better π-delocalization. Recombination of the charges returns the molecule 630 to its original state.

Case 10013977

A-15

The following requirements must be met in this model:

(a) The molecule must have a modest dielectric constant $\varepsilon_r$ and can be easily polarized by an external E-field, with $\varepsilon_r$ in the range of 2 to 10 and polarization fields ranging from 0.01 to 10 V/nm;

(b) At least one segment of the molecule must have non-bonding electrons, or π-electrons, or π-electrons and non-bonding electrons that can be mobilized over the entire molecule or a part of the molecule;

(c) The molecule can be symmetrical or asymmetrical;

(d) The inducible dipole(s) of the molecule can be oriented in at least one direction;

(e) The charges will be separated either partially or completely during E-field induced polarization;

(f) The states of charge separation or recombination can be E-field dependent or bi-stable, stabilized through inter- or intra-molecular forces such as covalent bond formation, hydrogen bonding, charge attraction, Coulomb forces, metal complex, or Lewis acid (base) complex, etc.;

(g) The process of charge separation or recombination of the molecule can involve or not involve σ- and π-bond breakage or formation; and (h) During the charge separation or re-combination process activated by an E-field, the band gap of the molecule will change depending on the degree of the non-bonding electron, or π-electron, or π-electron and non-bonding electron delocalization in the molecule. Both optical and electrical properties of the molecules will be changed accordingly.

One example of an E-field induced band gap change (color change) via charge separation or recombination involving bond breaking or bond formation is shown below (Example 3):

Case 10013977

A-16
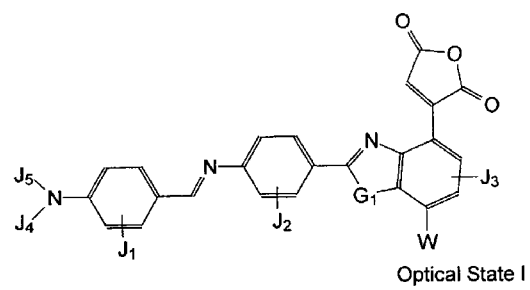
Optical State I
E-Field Direction — → +   E-Field Direction + ← —
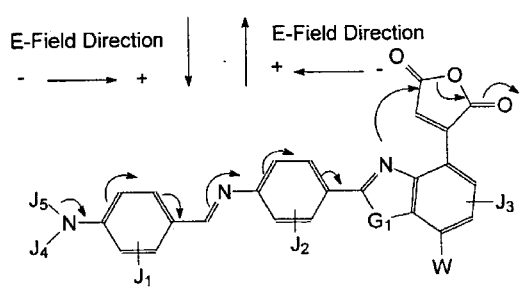
E-Field Direction — → +   E-Field Direction + ← —
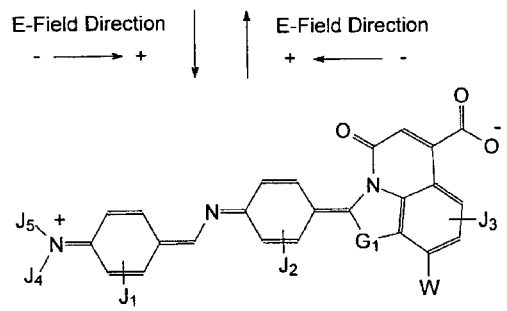
Optical State II
Example 3
where:

A-17

The letters $J_1$, $J_2$, $J_3$, $J_4$ and $J_5$ represent tuning groups built into the molecule. The function of these tuning groups (e.g., OH, NHR, COOH, CN, nitro, etc.) is to provide an appropriate functional effect (e.g., both inductive effect and resonance effects) and/or steric effects. The functional effect is to tune the band gap ($\Delta E_{HOMO/LUMO}$) of the molecule to get the desired electronic as well as optical properties of the molecule. The steric effect is to tune the molecule conformation through steric hindrance, inter- or intra-molecular interaction forces (e.g., hydrogen bonding, Coulomb interaction, van der Waals forces) to provide bi- or multiple-stability of molecular orientation. They may be any one of the following: hydrogen, hetero atom (e.g., N, O, S, P, B, F, Cl, Br and I), functional group with at least one of above-mentioned hetero atoms, hydrocarbon (either saturated or unsaturated) or substituted hydrocarbon.

The letter $G_1$ is a bridging group. The function of the bridging group is to connect two or more conjugated rings to achieve a desired chromophore. The bridging group may be any one of the following: hetero atoms (e.g., N, O, S, P, etc.) or functional group with at least one of above-mentioned hetero atoms (e.g., NH, etc.), hydrocarbon or substituted hydrocarbon.

The letter W is an electron-withdrawing group. The function of this group is to tune the reactivity of the maleic anhydride group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide etc.), nitro, nitrile, ketone, aldehyde, sulfone, sulfuric acid or its derivatives, hetero atoms (e.g., F, Cl, etc.) or functional group with at least one of the hetero atoms (e.g., F, Cl, Br, N, O, S, etc.).

An example of an E-field induced band gap change involving the formation of a molecule-metal complex or a molecule-Lewis acid complex is shown below (Example 4):

Case 10013977

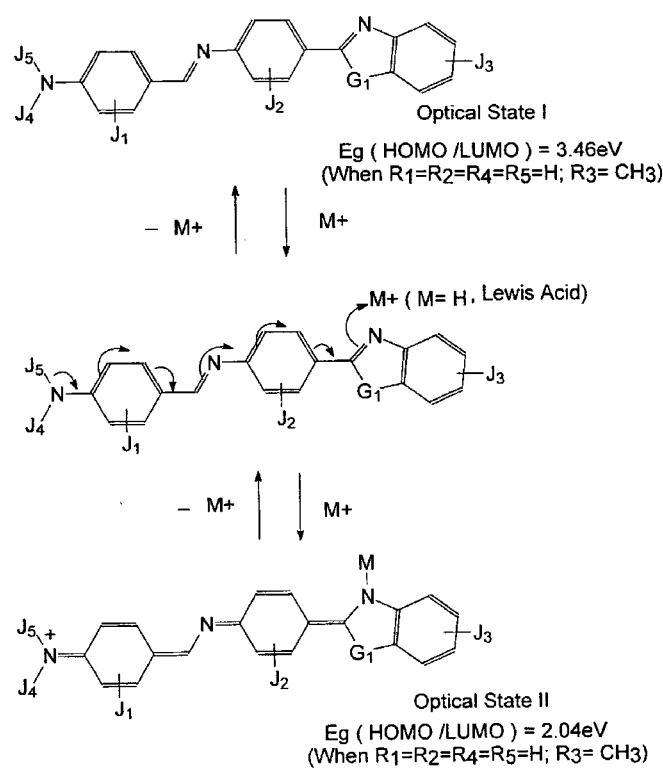

Example 4 where:

The letters $J_1$, $J_2$, $J_3$, $J_4$ and $J_5$ represent tuning groups built into the molecule. The function of these tuning groups (e.g., OH, NHR, COOH, CN, nitro, etc.) is to provide an appropriate functional effect (e.g. both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter-

A-19 or intra-molecular interaction forces (e.g., hydrogen bonding, Coulomb interaction, van der Waals forces) to provide bi- or multiple-stability of the molecular orientation. They may be any one of the following: hydrogen, hetero atom (e.g., N, O, S, P, B, F, Cl, Br, and I), functional group with at least one of the above-mentioned hetero atoms, hydrocarbon (either saturated or unsaturated) or substituted hydrocarbon.

The letter $G_1$ is a bridging group. The function of the bridging group is to connect two or more conjugated rings to achieve a desired chromophore. The bridging group may be any one of the following: hetero atoms (e.g., N, O, S, P, etc.) or functional group with at least one of above-mentioned hetero atoms (e.g., NH, etc.) or substituted hydrocarbon.

$M^+$ represents metals, including transition metals, or their halogen complexes or $H^+$ or other type of Lewis acid(s).

Model (2b): E-Field Induced Band Gap Change Caused by the Change of Extended Conjugation via Charge Separation or Recombination and π-Bond Breaking or Formation:

FIG. 6b is a schematic depiction of this model, which involves an E-field-induced band gap change caused by the change of extended conjugation via charge separation or recombination and π-bond breaking or formation. As shown in FIG. 6b, the molecule 630' comprises two portions 632' and 634'. The molecule 630' evidences a smaller band gap state. Application of an electric field causes breaking of the π-bond in the molecule 630', resulting in a larger band gap state. Reversal of the E-field re-connects the π-bond between the two portions 632' and 634' and returns the molecule 630' to its original state.

The requirements that must be met in this model are the same as listed for Model 2(a).

One example of an E-field induced band gap change cause by extended conjugation via charge separation (σ-bond breaking and π-bond formation) is shown below (Example 5):

Case 10013977

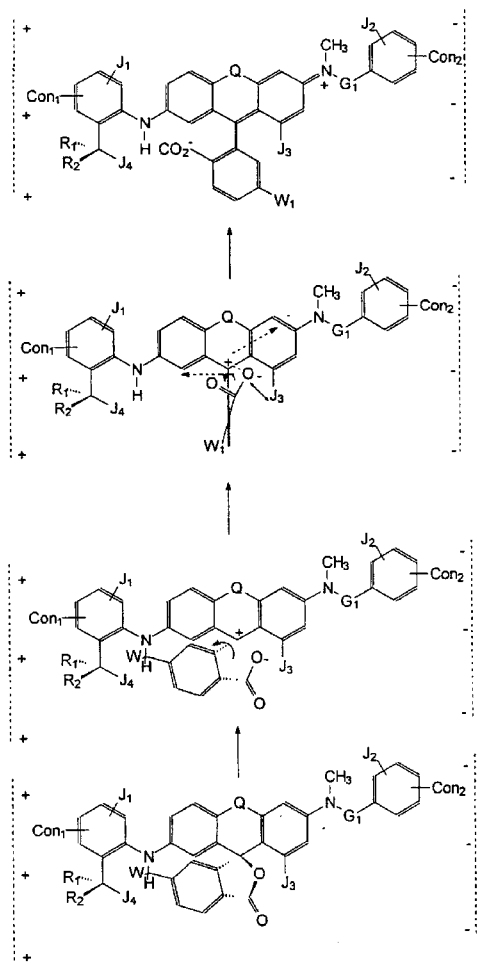
Example 5

A-21 where:

The letter Q is used here to designate a connecting unit between two phenyl rings. It can be any one of following: S, O, NH, NR, hydrocarbon, or substituted hydrocarbon.

The letters $Con_1$ and $Con_2$ are connecting groups between one molecule and another molecule or between a molecule and a solid substrate (e.g., metal electrode, inorganic or organic substrate, etc.). They may be any one of the following: hydrogen (through a hydrogen bond), hetero atoms (i.e., N, O, S, P, etc.) or functional groups with at least one of above-mentioned hetero atoms (e.g., NH, etc.), hydrocarbons (either saturated or unsaturated) or substituted hydrocarbons.

The letters $R_1$ and $R_2$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbons (either saturated or unsaturated) or substituted hydrocarbons.

The letters $J_1$, $J_2$, $J_3$ and $J_4$ represent tuning groups built into the molecule. The function of these tuning groups (e.g., OH, NHR, COOH, CN, nitro, etc.) is to provide an appropriate functional effect (e.g. both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter- or intra-molecular interaction forces (e.g., hydrogen bonding, Coulomb interaction, van der Waals forces) to provide bi- or multiple-stability of molecular orientation. They may also be used as spacing group to provide an appropriate 3-dimensional scaffolding to allow the molecules to pack together while providing rotational space for each rotor. They may be any one of the following: hydrogen, hetero atom (e.g., N, O, S, P, B, F, Cl, Br, and I), functional group with at least one of above-mentioned hetero atom, hydrocarbon (either saturated or unsaturated) or substituted hydrocarbon.

The letter $G_1$ is a bridging group. The function of the bridging group is to connect the stator and rotor or to connect two or more conjugated rings to achieve a desired chromophore. The bridging group may be any one of the following: hetero atoms (e.g., N, O, S, P, etc.) or functional groups with at least one of above-mentioned

A-22 hetero atoms (e.g., NH or NHNH, etc.), hydrocarbon (either saturated or unsaturated) or substituted hydrocarbon.

The letter W is an electron-withdrawing group. The function of this group is to tune the reactivity of the lactone group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide etc.), nitro, nitrile, ketone, aldehyde, sulfone, sulfuric acid or its derivatives, hetero atoms (e.g., F, Cl, etc.) or functional group with at least one of hetero atoms (e.g., F, Cl, Br, N, O and S, etc.), hydrocarbon (either saturated or unsaturated) or substituted hydrocarbon.

The uppermost molecular structure has a smaller band gap state than the lowermost molecular structure.

Another example of an E-field induced band gap change caused by breakage of extended π-bond conjugation via charge recombination and σ-bond formation is shown below (Example 6):

Case 10013977

A-23
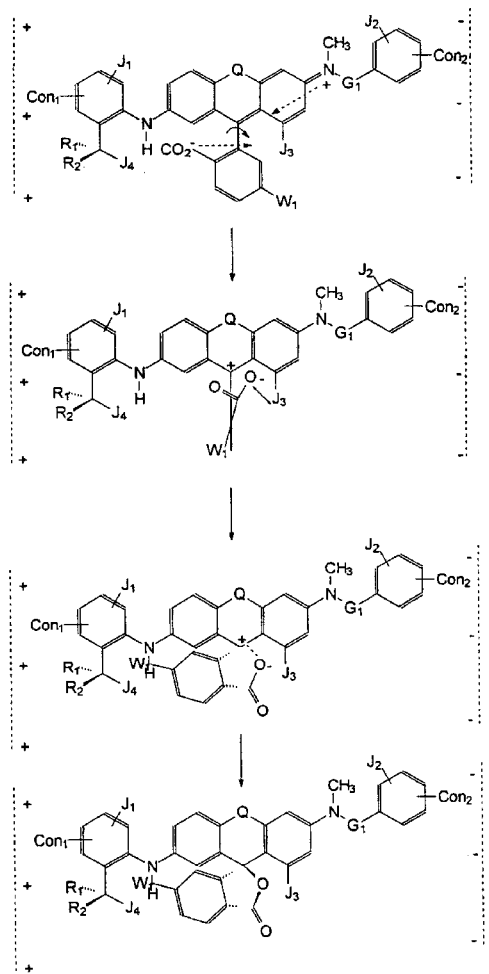
Example 6

A-24 where:

The letter Q is used here to designate a connecting unit between two phenyl rings. It can be any one of following: S, O, NH, NR, hydrocarbon, or substituted hydrocarbon.

The letters $Con_1$ and $Con_2$ are connecting groups between one molecule and another molecule or between a molecule and a solid substrate (e.g., metal electrode, inorganic or organic substrate, etc.). They may be any one of the following: hydrogen, hetero atoms (i.e., N, O, S, P, etc.) or functional group with at least one of above-mentioned hetero atoms (e.g., NH, etc.), hydrocarbon (either saturated or unsaturated) or substituted hydrocarbon.

The letters $R_1$ and $R_2$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbon (either saturated or unsaturated) or substituted hydrocarbon.

The letters $J_1$, $J_2$, $J_3$ and $J_4$ represent tuning groups built into the molecule. The function of these tuning groups (e.g., OH, NHR, COOH, CN, nitro, etc.) is to provide an appropriate functional effect (e.g., both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecule conformation through steric hindrance, inter- or intra-molecular interaction forces (e.g. hydrogen bonding, Coulomb interaction, van der Waals forces) to provide bi- or multiple-stability of molecular orientation. They may also be used as spacing groups to provide an appropriate 3-dimensional scaffolding to allow the molecules to pack together while providing rotational space for each rotor. They may be any one of the following: hydrogen, hetero atom (e.g., N, O, S, P, B, F, Cl, Br, and I), functional groups with at least one of above-mentioned hetero atom, hydrocarbon (either saturated or unsaturated) or substituted hydrocarbon.

The letter $G_1$ is a bridging group. The function of this bridging group is to connect stator and rotor or to connect two or more conjugated rings to achieve a desired chromophore. The bridging group may be any one of the following: hetero atoms (e.g., N, O, S, P, etc.) or functional group with at least one of above-mentioned

A-25 hetero atoms (e.g., NH or NHNH, etc.), hydrocarbon (either saturated or unsaturated) or substituted hydrocarbon.

The letter W is an electron-withdrawing group. The function of this group is to tune the reactivity of the lactone group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide, etc.), nitro, nitrile, ketone, aldehyde, sulfone, sulfuric acid or its derivatives, hetero atoms (e.g., F, Cl etc.) or functional group with at least one of hetero atoms (e.g., F, Cl, Br, N, O, S, etc.), hydrocarbon (either saturated or unsaturated) or substituted hydrocarbon.

Again, the uppermost molecular structure has a smaller band gap state than the lowermost molecular structure.

The present invention turns ink or dye molecules into active devices that can be switched with an external electric field by a mechanism completely different from any previously described electro-chromic or chromogenic material. The general idea is to use modified Crystal Violet lactone type of molecules in which the C-O bond of the lactone is sufficiently labile enough and can undergo a bond breaking and forming (see Examples 5 and 6 above) under the influence of an applied electric field.

A positive and a negative charge are generated during the C-O bond breaking process. The resulting charges will be separated and move in opposite directions parallel to the applied external field (upper part of the molecule), or bond rotation (lower part of the molecule. The two aromatic rings with an extended dipole (upper part and lower part) of the molecule is completely conjugated, and a color (red-shift) results (see Example 5). However, the molecule is designed to have inter- and/or intra-molecular forces, such as hydrogen bonding, Coulomb, or dipole-dipole interactions as well as steric repulsions, or by a permanent external E-field to stabilize both charges in this particular orientation. Thus, a large field is required to unlatch the molecule from its initial orientation. Once switched into a particular orientation, the molecule will remain in that orientation until it is switched out.

When a reverse E-field is applied (Example 6), both charges tend to realign themselves to the direction of the reverse external field. The positive charge on the Case 10013977

A-26 upper part of the molecule will migrate to the center part of the molecule (tri-aryl methane position ) from the side of the molecule through the non-bonding electron, or π-electron, or π-electron and non-bonding electron delocalization. Likewise, the negative charged lower part of the molecule will tend to move closer to the external E-field through C-C bond rotation. A key component of the molecule design is that there is a steric and static repulsion between the $CO_2^-$ and the $J_3$ and $J_4$ groups that will prevent the lower part of the molecule (the negative charged sector) from rotating through a complete 180 degree half cycle. Instead, the rotation is halted by the steric interaction of bulky groups on the lower part and the upper part at an angle of approximately 90 degrees from the initial orientation. Furthermore, this 90 degree orientation is stabilized by a C-O bond formation and charge recombination. During this process, a tetrahedral carbon (an isolator) is formed at the tri-aryl methane position. The conjugation of the molecule is broken and the HOMO and LUMO are no longer delocalized over the entire upper part of the molecule. This has the effect of shrinking the size of the volume occupied by the electrons, which causes the HOMO-LUMO gap to increase. A blue-shifted color or transparent state will result during this process.

For colored ink and dye molecules, the limitation of the positive charge migration just between one side of a molecule and the center position is crucial. Another important factor is the ability to switch the rotor (lower part of molecule) between two states separated by an optically significant angle (nominally 10 to 170 degrees) from the stators (the upper part of the molecule). When the intra-molecular charge separation reaches a maximum distance, then the upper most part of the molecule becomes completely conjugated. Thus, the π-electrons or π-electrons and non-bonding electrons of the molecule, through its highest occupied molecular orbital (HOMO) and lowest unoccupied molecular orbital (LUMO), are delocalized over the upper most region. The effect is identical to that for a quantum mechanical particle in a box: when the box is the size of the entire molecule, i.e., when the orbitals are delocalized, then the gap between the HOMO and LUMO is relatively small. In this case, the HOMO-LUMO gap of the molecule is designed to yield the desired color of the ink or dye. The HOMO-LUMO gap for the all-parallel structure can be tuned by substituting various chemical groups ($J_1$, $J_2$, $J_3$, $J_4$, and W) onto the different aromatic rings of the Case 10013977 molecule. In the case where the rotor (lower part of the molecule) is rotated by 10 to 170 degrees with respect to the stators (the upper part of the molecule), depending on the nature of the chemical substituents ($J_1$, $J_2$, $J_3$, $J_4$, and W) bonded to the rotor and stator, then the increased HOMO-LUMO gap will correspond to a color that is blue-shifted with respect to the color of the all-parallel structure. With sufficient shifting, the molecule becomes transparent, if the new HOMO-LUMO gap is large enough. Thus, the molecule is switchable between two colors or from one color to a transparent state.

Examples 5 and 6 show two different states of a representative switchable molecule under the influence of an externally applied E-field. For this particular type of molecule, a sufficiently thick molecular film is grown, for example using Langmuir-Blodgett techniques, vapor phase deposition, or electrochemical deposition, such that the orientation axis of the molecules is perpendicular to the plane of the electrodes used to switch the molecules. Another deposition technique is to suspend the molecule as a monomer/oligomer or solvent-based solution that is thick film coated (e.g., reverse roll) or spin-coated onto the substrate and subsequently polymerized (e.g., by UV radiation) or dried while the coating is subjected to an electric field that orients the molecule. A top electrode may be a transparent conductor, such as indium-tin oxide, and the films are grown such that the molecular axis is parallel to the plane of the electrodes. The molecules form solid-state or liquid crystals in which the large stator groups are locked into position by intermolecular interactions or direct bonding to a support structure, but the rotor is small enough to move within the lattice of the molecules.

Model (3): E-Field Induced Band Gap Change via Molecular Folding or Stretching

FIG. 7 is a schematic depiction of this model, which involves an E-field-induced band gap change caused by the change of extended conjugation via molecular folding or stretching. As shown in FIG. 7, the molecule 730 comprises three portions 732, 734, and 736. The molecule 730 evidences a smaller band gap state due to an extended conjugation through a large region of the molecule. Application of an electric field causes breaking of the conjugation in the molecule 730, due to molecular folding about the central portion 734, resulting in a larger band gap state due to the

A-28 non-extended conjugation in the large region of the molecule. Reversal of the E-field unfolds the molecule 730 and returns the molecule to its original state. Stretching and relaxing of the central portion 734 of the molecule 730 has the same effect.

The following requirements must be met in this Model:

(a) The molecule must have at least two segments;

(b) Several segments (portions) should have non-bonding electrons, or $\pi$-electrons, or $\pi$-electrons and non-bonding electrons involved in the HOMOs, LUMOs, and nearby orbitals;

(c) The molecule may be either symmetrical or asymmetrical with a donor group on one side and an acceptor group on another side;

(d) At least two segments of the molecule have some functional groups that will help to stabilize both states of folding and stretching through intra- or intermolecular forces such as hydrogen bonding, van der Waals forces, Coulomb attraction or metal complex formation;

(e) The folding or stretching states of the molecule must be E-field addressable;

(f) In at least one state (presumably in a fully stretched state), the non-bonding electrons, or $\pi$-electrons, or $\pi$-electrons and non-bonding electrons of the molecule will be well-delocalized, and the $\pi$- and p-electrons electrons of the molecule will be localized or only partially delocalized in other state(s);

(g) The band gap of the molecules will change depending on the degree of non-bonding electron, or $\pi$-electron, or $\pi$-electron and non-bonding electron delocalization while the molecule is folded or stretched by an applied external E-field, and this type of change will also affect the electrical or optical properties of the molecule as well; and (h) This characteristic can be applied to these types of molecules for optical or electrical switches, gates, storage or display applications.

An example of an E-field induced band gap change via molecular folding or stretching is shown below (Example 7):

Case 10013977

A-29

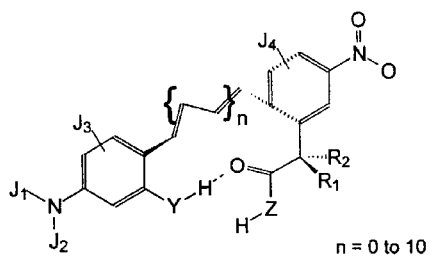

n = 0 to 10

Molecule Folding ⇅ Stretching Out

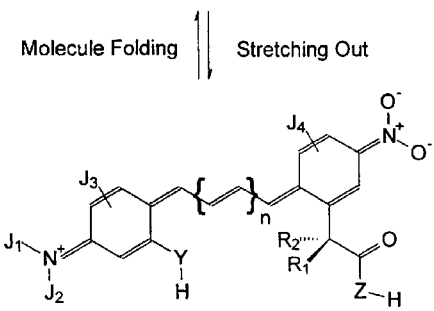

n = 0 to 10

Example 7 where:

The letters $R_1$ and $R_2$ represent spacing groups built into the molecule. They may be any one of the following: hydrogen, hydrocarbon (either saturated or unsaturated) or substituted hydrocarbon.

The letters $J_1$, $J_2$, $J_3$, $J_4$ and $J_5$ represent tuning groups built into the molecule. The function of these tuning groups (e.g., OH, NHR, COOH, CN, nitro, etc.) is used to provide an appropriate functional effect (e.g., both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter-

A-30 or intra-molecular interaction forces (e.g. hydrogen bonding, Coulomb interaction, van der Waals forces) to provide bi- or multiple-stability of molecular orientation. They may also be used as spacing group They may be any one of the following: hydrogen, hetero atom (e.g., N, O, S, P, B, F, Cl, Br and I), functional group with at least one of above-mentioned hetero atom, hydrocarbon (either saturated or unsaturated) or substituted hydrocarbon.

Letters Y and Z are functional groups that will form inter- or intra-molecular hydrogen bonding. They may be any one of following: SH, OH, amine, hydrocarbon, or substituted hydrocarbon.

The molecule on the top of the graphic has a larger band gap due to the localized conjugation various parts of the molecule, while the molecule on the bottom has a smaller band gap due to an extended conjugation through a large region of the molecule.

Case 10013977

What is claimed is:

1. An erasable writing medium comprising:
   a substrate; and
   at least one layer of a molecular colorant coating affixed to said substrate, wherein molecules of the coating are at east bichromal and selectively switchable between color states under influence of a localized electric field.

2. The medium at set forth in claim 1 comprising:
   said molecules are switchable between a transparent slate and a black state.

3. The medium as set forth in claim 1 comprising:
   said molecules are switchable between a transparent state and a primary color state.

4. The medium as set forth in claim 3 comprising:
   said molecular colorant coating is a layer of mosaically patterned molecules having an electrically addressable subpixel arrangement such that full color combinations can render a pixel in a plurality of hues.

5. The medium as set forth in claim 2 comprising:
   said colorant layer is an overlay for a mosaic pattern of primary color picture elements.

6. The medium as set forth in claim 1 comprising:
   said molecules exhibit an electric field induced band gap change.

7. The medium as sat forth in claim 6 comprising:
   said electric field induced band gap change occurs via a mechanism selected from a group including (1) molecular conformation change or an isomerization, (2) change of extended conjugation via chemical bonding change to change the band gap, and (3) molecular folding or stretching.

8. The medium as set forth in claim 6 comprising:
   said electronic field induced band gap change occurs via a molecular conformation change or an isomerization.

9. The medium as set forth in claim 8 wherein the molecules forming the molecular system further comprise:
   at least one stator portion and at least one rotor portion, wherein said rotor rotates from a first state to a second state with an applied electric field, wherein in said first state, there is extended conjugation throughout said molecular system, resulting in a relatively smaller band gap, and wherein in said second state, said extended conjugation is changed, resulting in a relatively larger band gap.

10. The medium as set forth in claim 8 comprising:
    dependent upon direction of electrical field applied, in a first of said states said molecules are in a more conjugated state having a relatively smaller band gap, and in a second of said states said colorant molecules are in a less conjugated state, having a relatively larger band gap.

11. The medium as set forth in claim 6 comprising:
    said electric field induced band gap change occurs via a change of extended conjugation via chemical bonding change to change the band gap.

12. The medium as sat forth in claim 11 comprising:
    said electric field induced band gap change occurs via a change of extended conjugation via charge separation or recombination accompanied by increasing or decreasing band delocalization.

13. The medium as set forth in claim 12 comprising:
    a change from a first state to a second state occurs with an applied electric field, said change involving charge separation in changing from said first state to said second state, resulting in a relatively smaller band gap state, with greater n-delocalization, and recombination of charge in changing from said second state to said first state, resulting in a relatively larger band gap state, with less n-delocalization.

14. The medium as set forth in claim 11 comprising:
    said electric field induced band gap change occurs via a change of extended conjugation via charge separation or recombination and n-bond breaking or formation.

15. The medium as set forth in claim 14 comprising:
    a change from a first state to a second state occurs with an applied electric field, said change involving charge separation in changing from said fist state to said second state, wherein in said first state there is no extended conjugation throughout, resulting in a relatively larger band gap state, and wherein in said second state said extended conjugation is formed and separated positive and negative charges are created, resulting in a relatively smaller band gap state.

16. The medium as set forth in claim 6 comprising:
    said electric field induced band gap change occurs via a molecular folding or stretching.

17. The medium as set forth in claim 16 comprising:
    said colorant has three portions, a first portion and a third portion, each bonded to a second, central portion, wherein a change from a first state to a second state occurs with an applied electric field, said change involving a folding or stretching about or said second portion, wherein in said first state there is extended conjugation, resulting in a relatively smaller band gap state, and wherein in said second state, said extended conjugation is changed, resulting in a relatively larger band gap.

18. The medium as set forth in claim 1 comprising:
    said molecules are bistable, providing a non-volatile component.

19. The medium as set forth in claim 1 comprising:
    said molecules have a low activation barrier between different said states providing a fast volatile switch.

20. The medium as set forth in claim 1 comprising:
    said molecules have more than two said states, switchable such that optical properties can be tuned either continuously by application of a decreasing or increasing electric field to form a volatile switch or color of selected composition regions is changed abruptly by application of voltage purses to switch with at least one molecular activation barrier.

21. The medium as set forth in claim 1 comprising:
    said system is configured for switching selected picture elements formed by said molecules between two visually distinctive color states.

22. The medium as set forth in claim 1 comprising:
    said molecular system is configured for switching selected picture elements formed by said molecules between a transparent stale and a color state.

23. The medium as set forth in claim 1 comprising:
    said molecular system changes between one index of refraction and another index of refraction.

24. The medium as set forth in claim 1 comprising:
    said molecules are bistable.

25. The medium as set forth in claim 1 comprising:
    said molecules are bimodal.

26. The medium as set forth in claim 1 wherein said molecules are arranged to form discrete, addressable subpixels of a surface of said substrate.

27. The medium as set forth in claim 26 wherein said subpixels consist of a mosaic pattern of said molecules wherein said pattern has optically combinable visual color states.

28. The medium as set forth in claim 26 wherein said subpixels consist of a mosaic pattern of said molecules wherein said pattern forms a mosaic of primary colors.

29. The medium as set forth in claim 26 wherein said molecules are selectively switchable between a transparent state and an opaque state and are distributed across said substrate as an overlay of a mosaic pattern of primary color subpixel regions printed on said substrate.

30. The medium as set forth in claim 26 where the colorant is printed on a white substrate for passive light viewing.

31. The medium as set forth in claim 26 wherein the colorant is printed on a transparent substrate for overhead projection use.

32. The medium as set forth in claim 1 comprising:
    said substrate is a material that is both flexible and durable for repeated imaging.

33. The medium as set forth in claim 32 wherein said flexible material is configured as a cut sheet print medium.

34. The medium as set forth in claim 32 wherein said flexible material is configured as a web print medium.

35. A print medium comprising:
    a substrate; and
    on said substrate, a molecular colorant system including electrochromic, switchable molecules, each of said molecules being selectively switchable between at least two optically distinguishable states via local electric field induced band gap changes.

36. The medium as set forth in claim 35 wherein said band gap changes occur via a mechanism selected from a group including (1) molecular conformational change or an isomerization, (2)change of extended conjugation via chemical bonding change to change the band gap, and (3) molecular folding or stretching.

37. A writable-erasable print medium comprising:
    a substrate; and
    a layer of colorant on said substrate wherein substantially all molecules of said colorant comprise bistable, bimodal, electrochromic molecules having an electrically set first state in which said molecules are substantially transparent and an electrically set second state in which said molecules are in a opaque state exhibiting a color or black condition.

38. The medium as set forth in claim 37 wherein said molecules exhibit an electric field induced band gap change.

39. The medium as set forth in claim 38 wherein said electric field induced bend gap change occurs via a mechanism selected from a group including (1) molecular conformation change or an isomenzation, (2) change of extended conjugation via chemical bonding change to change the band gap, and (3) molecular folding or stretching.

* * * * *